(12) United States Patent
Cao et al.

(10) Patent No.: US 11,080,292 B2
(45) Date of Patent: Aug. 3, 2021

(54) SYSTEM, METHODS, AND DEVICES FOR VISUAL CONSTRUCTION OF OPERATIONS FOR DATA QUERYING

(71) Applicant: ROYAL BANK OF CANADA, Montreal (CA)

(72) Inventors: Yanshuai Cao, Toronto (CA); Luyu Wang, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 331 days.

(21) Appl. No.: 16/189,634

(22) Filed: Nov. 13, 2018

(65) Prior Publication Data

US 2019/0147095 A1  May 16, 2019

Related U.S. Application Data

(60) Provisional application No. 62/585,169, filed on Nov. 13, 2017.

(51) Int. Cl.
*G06F 16/248* (2019.01)
*G06F 16/26* (2019.01)
*G06F 16/25* (2019.01)
*G06F 16/28* (2019.01)

(52) U.S. Cl.
CPC .......... *G06F 16/248* (2019.01); *G06F 16/26* (2019.01); *G06F 16/252* (2019.01); *G06F 16/283* (2019.01)

(58) Field of Classification Search
None
See application file for complete search history.

(56) References Cited

U.S. PATENT DOCUMENTS

| | | | |
|---|---|---|---|
| 2013/0046790 A1* | 2/2013 | Katz | H04S 3/002 707/792 |
| 2015/0074130 A1* | 3/2015 | Kimmel | G06F 16/284 707/756 |
| 2015/0154248 A1* | 6/2015 | Deng | G06F 16/283 707/736 |
| 2018/0144003 A1* | 5/2018 | Formoso | G06F 16/244 |
| 2019/0227536 A1* | 7/2019 | Celia | G06K 9/6263 |
| 2019/0285770 A1* | 9/2019 | Nyberg | G06T 1/20 |

* cited by examiner

*Primary Examiner* — Christopher J Raab
(74) *Attorney, Agent, or Firm* — Norton Rose Fulbright Canada LLP

(57) ABSTRACT

A platform, device and process is provided for visual construction of operations for data querying. In particular, embodiments described herein provides a platform, device and process for visual construction of nested operations for data querying. The visual construction is a display of one or more projected data spaces enabling a selection of data indicators on the display. The selection is conducted graphically on the visual construction and the system is configured to translate the selection to generate and conduct a query operating visually on the visualized (e.g., projected) data space. The visual data space includes distinct views of the plurality of multi-dimensionality data points mapped to reduced-dimensionality data points with a transformation function associated with each view. The selections are used to augment the multi-dimensionality data points with one or more additional dimensions to track the selections and to perform operations and visualizations.

20 Claims, 16 Drawing Sheets

Step 1: 2D pca, ica, and tsne are computed and appended to the dataframe

| id | feature 1 | feature 2 | ... | pca 1 | pca 2 | tsne 1 | tsne 2 |
|---|---|---|---|---|---|---|---|
| 0 | 28.5 | 0.429 | ... | 0.179 | 0.11 | 0.141 | 0.018 |
| 1 | 16.2 | 0.935 | ... | 0.639 | 0.472 | 0.389 | 0 |
| 2 | 33.7 | 0.95 | ... | 0.657 | 0.506 | 0.41 | 0.003 |
| 3 | 18 | 0.954 | ... | 0.642 | 0.482 | 0.391 | 0.002 |
| 4 | 16.5 | 0.952 | ... | 0.672 | 0.51 | 0.406 | 0.002 |
| 5 | -2.1 | 0.951 | ... | 0.701 | 0.493 | 0.409 | 0.002 |
| 6 | 8.8 | 0.941 | ... | 0.699 | 0.498 | 0.409 | 0.011 |
| 7 | 5.6 | 0.937 | ... | 0.697 | 0.497 | 0.407 | 0.009 |
| 8 | 7.9 | 0.92 | ... | 0.723 | 0.5 | 0.379 | 0.011 |

FIG. 9A

Step 2: this plot only shows two tsne axes. User selects data from one plot. The backend memorizes their indices.

SYSTEM, METHODS, AND DEVICES FOR VISUAL CONSTRUCTION OF OPERATIONS FOR DATA QUERYING

CROSS REFERENCE

This application is a non-provisional of, and claims all benefit, including priority to, U.S. Provisional Application No. 62/585,169, filed on 13 Nov. 2017, entitled "SYSTEM AND METHOD FOR VISUAL CONSTRUCTION OF NESTED OPERATIONS FOR DATA QUERYING" (also referenced as "SYSTEM, METHODS, AND DEVICES FOR VISUAL CONSTRUCTION OF OPERATIONS FOR DATA QUERYING"), incorporated herein by reference in its entirety.

FIELD

Embodiments herein described relate generally to computer data querying and, more specifically, to computer-implemented rendering of visual constructions of operations for data querying.

INTRODUCTION

Querying data on a data source can be performed by Structured Query Language (SQL) and its derivatives. SQL supports selecting data instances from multiple tables through relational techniques.

However, to explore and query data from a database using SQL, one must know and write in a query language and know the database schema and variable space. SQL operates only on the original data space, and a professional has to be well-trained to efficiently undertake such a job. Further, their efficiency is limited by SQL itself. There is a need to improve accessibility for data querying and enable different and/or more complex queries or queries less limited by the structure of the underlying database schema.

Multi-dimensional points for data having "dimensions" storing information relating to different aspects associated with a particular point are difficult to visualize and conceptualize. For example, health data may have thousands of features stored in higher-dimensional components of each point. If each point represents a unique patient, an example of higher dimensional data can include age, weight, height, blood analysis characteristics, stool sample characteristics, blood pressure metrics, oxygen saturation characteristics, and transformations thereof.

Human pattern recognition for higher dimensional data sets is limited based on a particular view that is being shown to the user based on the higher dimensional points. For example, selections of different dimensions and transformations thereof (e.g., logarithmic versions) for mapping to viewing dimensions (e.g., X, Y, color) can drastically modify how clustered the data appears, etc.

SUMMARY

A specially configured device for rendering and controlling user interfaces presented based on underlying higher-dimensional points is described in various embodiments, where a number of different views are rendered and selections thereof of points mapped to different approaches at generating reduced dimensionality views are captured. The selections of points pertaining to each view are utilized in concert to establish a subset or superset of selected points based on the aggregated inputs of the user on the user interfaces. The subset or superset of selected points can then be utilized to generate an output data file or data record, which can be a container of higher-dimensional data points, or identifiers thereof, for providing to a downstream system.

The user interfaces are adapted for visualizing higher dimensional space by generating reduced dimensionality constellations of points, each point representing an underlying higher-dimensional point transformed into a reduced dimensional space, for example, a two dimensional Euclidean plane where the X and Y coordinates represent transformed aspects of the higher dimensional components of the underlying higher-dimensional point. In another embodiment, other aspects are used to visually show additional transformed dimensions, including a radius of a point, an opacity of a point, a color of a point across the visible color spectrum, a shadowing effect, a different marker type (e.g., triangle, square, "x"), dynamic movement effects, among others. Views can further correspond to three-dimensional Euclidean spaces, other types of vector spaces, manifolds, non-Euclidean geometries, etc.

Each visualization represented in a view is different such that a user is able to more effectively determine relationships between data points through visual pattern recognition. Visual pattern recognition, for example, can include noting that particular data is highly clustered into groups in some views, certain visual structures become present (e.g., recurring shapes or motifs), which are based on positional characteristics of the points as shown in each view.

The user interfaces and controls thereof are adapted to render a plurality of distinct views that are derived based on reduced dimensionality versions of the higher-dimensional points. The distinct view can be generated based on different reduction approaches in relation to a same set of higher-dimensionality data points, and transformations/truncations thereof. Showing different, distinct views allows pattern recognition to be conducted across different representations of the data, reducing an overreliance on any one particular view or paradigm. Transformations can include cross-dimension compression/concatenation, truncations of entire dimensions, non-linear translations of data in singular dimensions or across multiple dimensions (e.g., convolutions), etc.

The user is able to establish a plurality of selections through manipulating an input tool to select a number of points, each selection corresponding to a view. Commonly selected points across multiple views (an intersection), in an embodiment, can be used to establish a selected set of points whose identifiers can be stored in a data structure for downstream usage. In an alternate embodiment, all points selected across multiple views (a union) can be used to establish a selected set of points whose identifiers can be stored in a data structure for downstream usage.

Accordingly, a data scientist or other user is able to, using the user interface, interact with data across multiple views, and, using the data scientist's pattern recognition, establish groupings or areas of interest in which a set of data points may reside. Iterating this process across a number of distinct views allows the user to conduct pattern recognition having different potential interpretations of the data. The union or intersect across the distinct views enables interaction between the different selections such that commonalities and patterns across views can be established.

Selection, for example, may be provided using different input tools, such as mouse input, touch screen, or point by point selection. The input tools, for example, can establish polygonal areas (e.g., rectangles), irregular shapes (e.g., lassos), which may be continuous (e.g., rectangle) or discontinuous (e.g., multiple rectangles).

A number of underlying points are selected in each view, which are then tracked for conducting a query operation as between the selections of each different view. While query operations "union" and "intersect" are described more extensively in various embodiments herein, other embodiments having different query operations are contemplated. The selection of different points may be useful, for example, in identifying emergent properties as between interactions of different dimensions being considered and across different views, which may not be readily apparent if only one view is being considered. Where the operation between selections in each view is an intersect where only points in common across some (e.g., 2 or more, 3 or more) or all of the views, the recognized pattern is effectively being validated across different views and different types of selected groups or clusters.

An output may be a data structure or a data record indicative of or storing the data points resulting from the query operation. For example, the points in common between various selections obtained from the views may be extracted for storage in a separate data structure, or identifiers indicating memory locations (e.g., pointers) may be recorded such that the points in common may be easily retrieved or accessed by a downstream computing device.

In some embodiments a structured query language query string is generated based on the selected points recorded in or having identifiers recorded in the data structure. The query string, in an embodiment, is a union of all points selected after the query operation as between the selections of each different view.

A platform, device and process for visual construction of operations for data querying is described. In particular, embodiments described herein provides a platform, device and process for visual construction of nested operations for data querying.

The platform is computer-implemented, and is implemented using one or more computing resources that are configured to generate renderings on a display interface of data spaces for data querying, and responsive to input signals received from the interface, identifying an area indicative of one or more data points and generating a structured query language request (e.g., a domain specific language, such as SQL, used for interfacing with data stored in a relational database management system).

The platform may be provided in the form of a software tool, or a tool implemented in a combination of software and hardware. In some embodiments, the platform is supported through one or more computer processors operating in a computer server. In a specific embodiment, the tool is a physical server appliance configured for interconnection and placement into a data center, receiving data through a messaging bus on a network and generating one or more data query renderings for facilitating the generation of structured SQL queries responsive to inputs from a user based on the data query renderings. Where a physical server appliance is used for implementation, the physical server appliance includes at least one of optimized processors and memory.

Embodiments described herein can be used to generate a display of one or more projected data spaces of a data source or a part of or whole data source. References to a projected data space can include the original data space and any set of data in the original data space.

In some embodiments described herein, the projected data spaces correspond to a reduced-dimensional space of a hyper-dimensional data source. Embodiments described herein are configured to enable selection of data indicators on the display and identify an association between the selected data indicators and the data in the data source they represent (e.g., that was used in their generation).

The data is retrieved and other data indictors on displays of the same or other projected data spaces are augmented (e.g., covered within a shaded overlay, highlighted, bolded, annotated) where the other data indicators correspond to the retrieved data. Some embodiments described herein are configured to augment data indicators that correspond to an ordered and/or nested selection, union, intersection, or other operation on the retrieved data.

In accordance with an aspect, there is provided a method for constructing queries on a data source, comprising receiving data encoding data indicators, wherein the data indicators correspond to data in a data space; determining an association between each of the selected data indicators and data stored in a logical table, wherein each of the selected data indicators are associated with the data used in generating that selected data indicator; and retrieving the data associated with the selected data indicators.

In accordance with an aspect, there is provided a method wherein the data space is a projected data space of an original data space.

In accordance with an aspect, there is provided a method wherein the method includes, for each retrieved set of data, retrieving data associated with an intersection of each set of retrieved data.

In accordance with an aspect, there is provided a method wherein the method includes, for each retrieved set of data, retrieving data associated with a union of each set of retrieved data.

In accordance with an aspect, there is provided a method wherein the method includes, for each retrieved set of data, retrieving data associated with an ordered and/or nested sequence of selections, unions, and/or intersections of each set of retrieved data.

In accordance with an aspect, there is provided a method wherein the projected data space is a reduced-dimensional space of a hyper-dimensional data space.

In accordance with an aspect, there is provided a method wherein the reduced-dimensional space is generated from the hyper-dimensional data space using one or more machine learning algorithms.

In accordance with an aspect, there is provided a method wherein the projected data space is a representation of a single column in the logical table.

In accordance with an aspect, there is provided a method wherein the data is selected by visual indicators on the projected data space.

In accordance with an aspect, there is provided a method wherein the data associated with the selected data indicators are displayed on the projected data space and/or one or more other projected data spaces.

In accordance with an aspect, there is provided a method wherein indicators are generated on one or more other projected data spaces, the indicators augmenting second data indicators on the one or more second projected data spaces, the second data indicators generated from a dataset in the data space, the dataset corresponding to data associated with the selected data indicators.

In accordance with an aspect, there is provided a method wherein the projected data space is displayed as a scatterplot, map, histogram, chart, or table.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 9A is a table showing an example set of higher-dimensionality points having augmented columns showing additional dimensions, according to some embodiments.

DETAILED DESCRIPTION

Figure 1:
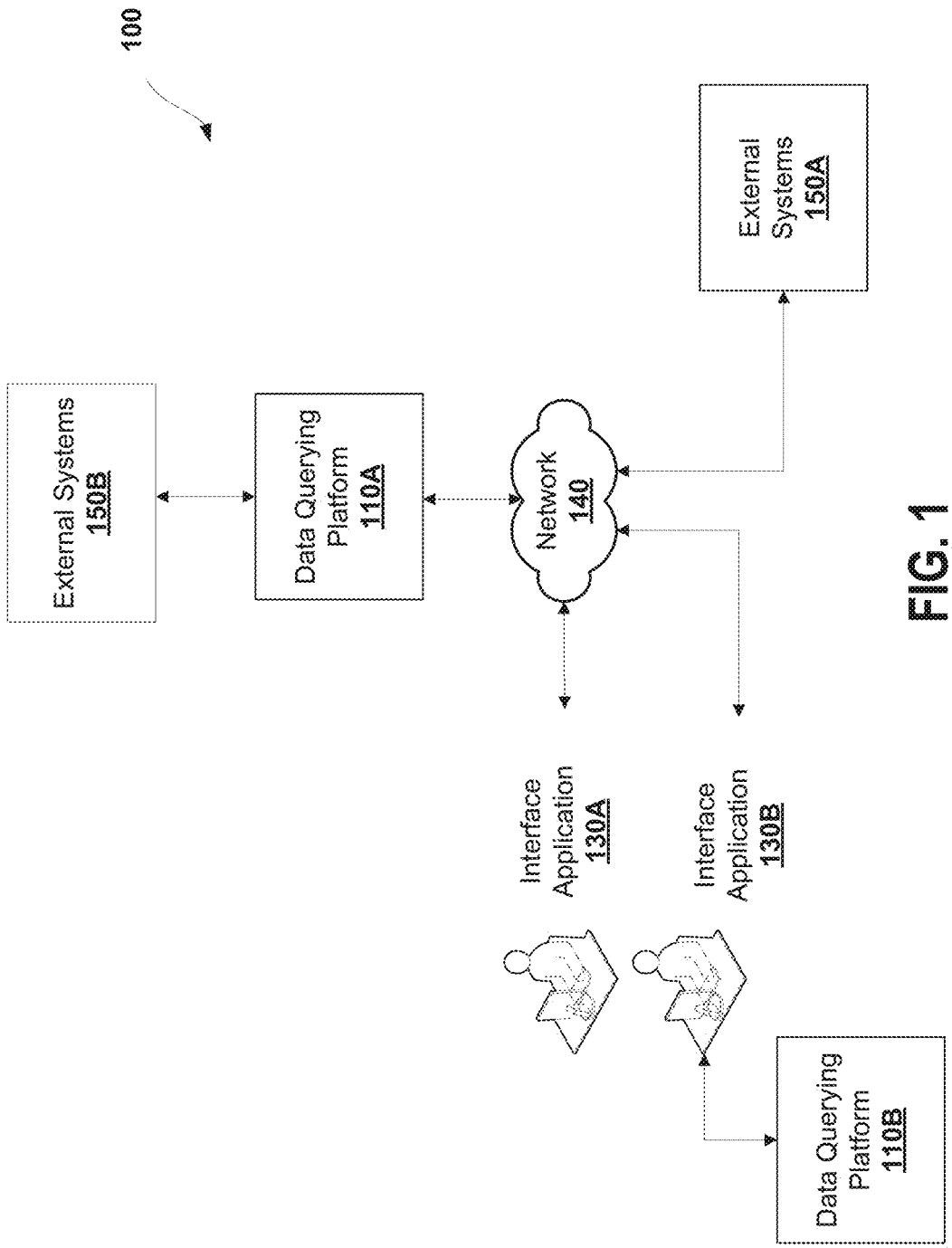
FIG. 1 is a block schematic view of an example data querying system, including data querying platform, according to some embodiments.

A specially configured device for rendering and controlling user interfaces presented based on underlying higher-dimensional points is described in various embodiments, where a number of different views are rendered and selections thereof of points mapped to different approaches at generating reduced dimensionality views are captured. The selections of points pertaining to each view are utilized in concert to establish a subset or superset of selected points based on the aggregated inputs of the user on the user interfaces. The subset or superset of selected points can then be utilized to generate an output data file or data record, which can be a container of higher-dimensional data points, or identifiers thereof, for providing to a downstream system.

SQL itself does not operate visually on a projected data space or easily allow irregular types of selections. Embodiments described herein provide a platform, device and process for visual construction of operations for data querying. In particular, embodiments described herein provides a platform, device and process for visual construction of nested operations for data querying.

Embodiments described herein can be used to generate a display of one or more projected data spaces of a data source. References to a projected data space can include the original data space and any set of data in the original data space. In some embodiments described herein, the projected data spaces correspond to a reduced-dimensional space of a hyper-dimensional data source. Embodiments described herein are configured to enable selection of data indicators on the display and identify an association between the selected data indicators and the data in the data source that they represent (e.g., that was used in their generation).

The user interfaces are adapted for visualizing higher dimensional space by generating reduced dimensionality constellations of points, each point representing an underlying higher-dimensional point transformed into a reduced dimensional space, for example, a two dimensional Euclidean plane where the X and Y coordinates represent transformed aspects of the higher dimensional components of the underlying higher-dimensional point. In another embodiment, other aspects are used to visually show additional transformed dimensions, including a radius of a point, an opacity of a point, a color of a point across the visible color spectrum, a shadowing effect, a different marker type (e.g., triangle, square, "x"), dynamic movement effects, among others. Views can further correspond to three-dimensional Euclidean spaces, other types of vector spaces, manifolds, non-Euclidean geometries, etc.

Each visualization represented in a view is different such that a user is able to more effectively determine relationships between data points through visual pattern recognition. Visual pattern recognition, for example, can include noting that particular data is highly clustered into groups in some views, certain visual structures become present (e.g., recurring shapes or motifs), which are based on positional characteristics of the points as shown in each view.

The data is retrieved and other data indictors on the same or other projected data spaces are augmented where the other data indicators correspond to the retrieved data. Some embodiments described herein are configured to augment data indicators that correspond to an ordered and/or nested selection, union, intersection, or other operation on the retrieved data. For example, augmentation of one or more data indicators can include covering within a shaded or translucent overlay, highlighting, bolding, annotating, or enhancing its visual perception.

The user interfaces and controls thereof are adapted to render a plurality of distinct views that are derived based on reduced dimensionality versions of the higher-dimensional points. The distinct view can be generated based on different reduction approaches in relation to a same set of higher-dimensionality data points, and transformations/truncations thereof. Showing different, distinct views allows pattern recognition to be conducted across different representations of the data, reducing an overreliance on any one particular view or paradigm. Transformations can include cross-dimension compression/concatenation, truncations of entire dimensions, non-linear translations of data in singular dimensions or across multiple dimensions (e.g., convolutions), etc. The system generates signals to render, on an interactive interface or a display interface a plurality of display layouts that each show one of the distinct views, and reduced-dimensionality-based constellations of data points thereof.

Control signals may include signals sent to control a display model based on a model-view-controller topology, for example providing display coordinate pairs/triplets or relative positioning thereof, and other visual characteristic modification information, which is then received by a display rendering component residing in or coupled to the display interface and translated into a graphical user interface for presentment on a screen. The designation of design features and content sheets, for example, can be dictated on-demand/dynamically, in some embodiments, for example, through the application of style sheets, rules for formatting (e.g., if on mobile vs. desktop), among others. For example, the React™ Javascript library or the AJAX™ framework may be used to dynamically render the interfaces using the underlying data sets signalled from the system.

The user is able to establish a plurality of selections through manipulating an input tool to select a number of points, each selection corresponding to a view. Commonly selected points across multiple views (an intersection), in an embodiment, can be used to establish a selected set of points whose identifiers can be stored in a data structure for downstream usage. In an alternate embodiment, all points selected across multiple views (a union) can be used to establish a selected set of points whose identifiers can be stored in a data structure for downstream usage.

Accordingly, a data scientist or other user is able to, using the user interface, interact with data across multiple views, and, using the data scientist's pattern recognition, establish groupings or areas of interest in which a set of data points may reside. Iterating this process across a number of distinct views allows the user to conduct pattern recognition having different potential interpretations of the data. The union or intersect across the distinct views enables interaction between the different selections such that commonalities and patterns across views can be established.

Selection, for example, may be provided using different input tools, such as mouse input, touch screen, or point by point selection. The input tools, for example, can establish polygonal areas (e.g., rectangles), irregular shapes (e.g., lassos), which may be continuous (e.g., rectangle) or discontinuous (e.g., multiple rectangles).

A number of underlying points are selected in each view, which are then tracked for conducting a query operation as between the selections of each different view. While query operations "union" and "intersect" are described more extensively in various embodiments herein, other embodiments having different query operations are contemplated. The selection of different points may be useful, for example, in identifying emergent properties as between interactions of different dimensions being considered and across different views, which may not be readily apparent if only one view is being considered. Where the operation between selections in each view is an intersect where only points in common across some (e.g., 2 or more, 3 or more) or all of the views, the recognized pattern is effectively being validated across different views and different types of selected groups or clusters.

An output may be a data structure or a data record indicative of or storing the data points resulting from the query operation. For example, the points in common between various selections obtained from the views may be extracted for storage in a separate data structure, or identifiers indicating memory locations (e.g., pointers) may be recorded such that the points in common may be easily retrieved or accessed by a downstream computing device.

In some embodiments a structured query language query string is generated based on the selected points recorded in or having identifiers recorded in the data structure. The query string, in an embodiment, is a union of all points selected after the query operation as between the selections of each different view.

In some embodiments, a special purpose computer is programmed to perform one or more particular functions described herein from program software. The special purpose computer provides a platform for visual construction of operations for data querying, and can be provided in the form of a distributed resources application (e.g., cloud operation), a specific data server residing in a data center controlling hardware computer processors, among others.

For example, a special purpose computer can be programmed to provide a data querying system 100, including a data querying platform 110 configured to connect to an interface application 130. For example, the special purpose computer can be programmed to provide visual construction of operations for data querying. Operations can include nested sequences of selections, joins, unions, intersections, or other operations on or between data represented by data indicators on a display.

The platform is computer-implemented, and is implemented using one or more computing resources that are configured to generate renderings on a display interface of data spaces for data querying, and responsive to input signals received from the interface, identifying an area indicative of one or more data points and generating a structured query language request (e.g., a domain specific language, such as SQL, used for interfacing with data stored in a relational database management system).

The data querying system 100 is adapted for providing an interactive interface for visual construction of data querying operations in relation to a plurality of higher-dimensionality data points on interface application 130.

The platform may be provided in the form of a software tool, or a tool implemented in a combination of software and hardware. In some embodiments, the platform is supported through one or more computer processors operating in a computer server. In a specific embodiment, the tool is a physical server appliance configured for interconnection and placement into a data center, receiving data through a messaging bus on a network and generating one or more data query renderings for facilitating the generation of structured SQL queries responsive to inputs from a user based on the data query renderings. Where a physical server appliance is used for implementation, the physical server appliance includes at least one of optimized processors and memory.

Embodiments described herein can be used to generate a display of one or more projected data spaces of a data source or a part of or whole data source. References to a projected data space can include the original data space and any set of data in the original data space.

In some embodiments described herein, the projected data spaces correspond to a reduced-dimensional space of a hyper-dimensional data source. Embodiments described herein are configured to enable selection of data indicators on the display and identify an association between the selected data indicators and the data in the data source they represent (e.g., that was used in their generation).

The data is retrieved and other data indicators on displays of the same or other projected data spaces are augmented (e.g., covered within a shaded overlay, highlighted, bolded, annotated) where the other data indicators correspond to the retrieved data. Some embodiments described herein are configured to augment data indicators that correspond to an ordered and/or nested selection, union, intersection, or other operation on the retrieved data.

The special purpose computer can receive one or more datasets, each dataset representing selections of visual indicators representing data. The special purpose computer can generate data queries (e.g., nested joins, unions, intersections, etc.) or associations between the selected data indicators and data in a data source. The special purpose computer can be configured to use the data queries or associations to retrieve the data and present the data to a user and/or augment data indicators on a variety of displays that correspond to that data. The program software can be stored and compiled in the special purpose computer and a processor can be configured to execute instructions, for example, in memory, according to the program.

FIG. 1 is a block schematic view of an example data querying system 100 according to some embodiments. Data querying system 100 includes data querying platform 110, which includes query device 120. Data querying platform platform 110 interconnects to interface application 130, for example, to display data indicators on a projected data space to a user engaged with interface application 130 or to receive one or more selections of data indicators from the user. In this rendering, different colors, shapes, or symbols can be utilized to show that the points are corresponding to different categories or data sets (e.g., none, classic, junior, gold, in credit card type).

The data indicators can be selected from the same or different projected data spaces. For example, a projected data space can be a reduced-dimensional space of high-dimensional data in the data source or can be data corresponding to a single column in a logical table in the data source.

The projected data spaces can be configured to display a scatterplot (e.g., in the case of a two-dimensional space) or as a histogram (e.g., in the case of data corresponding to a single column in a logical table). Each projected data space can display data indicators corresponding to a different subset of data in the same underlying data space. Interface application 130 can receive selections from a user through different sensors.

A data indicator can be an annotation, bullet, bar on a histogram (or portion of a bar), or point on a scatterplot, for example. Data querying platform 110 is configured to receive one or more selections of data indicators from a user as data encoding information such as coordinates, numerical values, labels denoting identity, row indices corresponding to a column data structure in a library (e.g., the Python Bokeh™ library), or other values, for example, that indicate a data value in a projected space plotted on a scatterplot display at interface application 130.

Data querying platform 110 is configured to connect to interface application 130 to generate one or more displays of one or more projected data spaces to be presented to a user engaged at interface application 130 and to receive one or more inputs (e.g., selections of data indicators) from the user.

Each display is configured to present data points from the same underlying data source as data indicators. Data querying platform 110 is configured to generate data enabling one or more displays based on data from the same underlying data source.

Data querying platform 110 is configured to transmit the data to interface application 130 for display. For example, data querying platform 110A can connect to interface application 130A over a network 140 or data querying platform 100B can connect to interface application 130B directly.

In some embodiments, interface application 130 receives data (e.g., coordinates, row indices mapping data indicators to data they represent in a data source, etc.) representing visual indicators on a projected data space, for example, free-form selections of data indicators (e.g., displayed on a scatterplot) on a projected data space. For example, a visual indicator can be a free-form selection displayable over a display of a projected data space.

A free-form selection can be an individual selection of data indicators, selection of all indicators in a box-shaped area on a visual display of the projected data space, or selection of all indicators in any other shaped area (e.g., a lasso selection) on a visual display of the projected data space. In another example, a free-form selection can be selection of data indicators (e.g., bars) on a histogram display of a projected data space corresponding to a single column in an underlying logical table in the data source.

Interface application 130 is configured to generate an interface indicating that a user may input a selection of a type of projected data space to display and the display type of the projected data space for the same data source.

Types of projected data spaces can include a selection or transformation of data in the data source and may be provided using SQL queries or data querying platform 110. The display type of the projected data space can include scatterplot representations or histogram representations, for example.

Interface application 130 is configured to receive input data (e.g., mouse selection, pen selection, a lasso, a square, a circle selection) from a user and transmit a request to data querying platform 110 for data enabling the generation of the type of projected data space to display as well as a display type of the projected data space. The input data is processed to convert the input into a selection area, the selection area then utilized to determine the selected projected data space. With this selection, the conversion translates the selected area into constructed complex queries using arbitrary conjunctive and disjunctive operations. In some embodiments, visual renderings are applied to renderings of the original data columns, and in other embodiments, visual renderings are applied to renderings of projections of the original data columns (e.g., translated/transformed versions).

Transformations, for example, may be particularly useful to provide different types of view that may be amenable to human pattern recognition. For example, transformations may include dimensionality reductions, rotations, translations, log transformations, root transformations, statistical inferences, coordinate system changes, integral transformations, among others.

Interface application 130 can organize the received input data or aggregate the input data with other data before transmitting a request to data querying platform 100, for example, using time stamps and clock data for synchronization.

Customization of the type of projected data space to display as well as the display type of the projected data space can improve usability, user experience, and ability to query the data source by improving which data indicators are presented and how they are presented for selection.

As an example, data enabling the generation of a projected data space can include features selected by one or more machine learning algorithms trained on hyper-dimensional data represented in an original data space, as well as data determining the presentation of the features in graphical user interface elements configured based on user inputted preference. As an example, data enabling generation of a display type can include data specifying the size, angle, scale, and look-and-feel of the and data indicators and display type, where display types include scatterplots, histograms, or maps, for example.

Data querying platform 110 is configured to receive data corresponding to selected data indicators from interface application 130. Data querying platform 110 is configured to associate the data (e.g., using respective row indices received) with data in the data source that corresponds to the selected data indicators, for example, the data that was used to generate the data indicators or the data that the data indicators otherwise corresponds to or represents. Associations may include linkages, such as relational identifiers, memory location pointers, etc., and associations may be weighted, directional, or bi-directional.

Data querying platform 110 is configured to identify other data closely associated with the data corresponding to the selected data indicators, for example, can identify data in the same row as the data corresponding to the selected data indicators. The data source can be provided to data querying platform 110 from external systems 150 (e.g., external system 150A, external system 150B, etc.), one or more local databases at data querying platform 110, and/or one or more databases at interface application 130. Data querying platform 110 is configured to retrieve the identified data, store the data, process the data (e.g., to generate data enabling presentation of the retrieved data), and/or transmit the data, for example, to interface application 130 for presentation to a user. The external systems may include various types of data sources, such as financial institution data (e.g., fraud, lending, user demographics, stock trading returns), among others.

In some embodiments, data querying platform 110 is configured to retrieve the identified data based by generating one or more queries or nested queries to retrieve the data. Data querying platform 110 is configured to generate the one or more queries based on the data indicators selected and the location of the data they represent (e.g., location in different logical tables in a database, location in various data structures, etc.).

In some embodiments, the selected data indicators can be associated with data in the same logical table representation or in different logical table representations of the data source. For example, data querying platform 110 is configured to identify data retrievable from a data store using a union, intersection, join, except, select, projection, aggregation, other relational operation, or ordered and/or nested combination of same over one or more logical table representations of the data source. Data querying platform 110 is configured to retrieve the identified data, store the data, process the data (e.g., to generate data enabling presentation of the retrieved data), and/or transmit the data, for example, to interface application 130 for presentation to a user.

Data querying platform 110 is configured to retrieve the data associated with the selected data indicators, process the data and/or combine the data with other data (e.g., facilitating display or dynamic responsiveness to user engagement), and generate data enabling presentation of the retrieved data, processed data, or combined data. For example, data querying platform 110, in some embodiments, is configured to generate data enabling display of the results of a selection of data indicators in a tabular, textual, or graphical display.

In some embodiments, some of the selected data indicators can be selected from over a different projected data space than other selected data indicators. One or more sets of data indicators can be selected from one or more different projected data spaces or displays at interface application 130.

Data querying platform 110 is configured to retrieve sets of data from the data source, where each set of data is associated with each of the one or more sets of data indicators. For example, data querying platform 110 is configured to generate one or more queries or nested queries to retrieve the data. Data querying platform 110 is configured to use the query or queries to perform a union, intersection, join, except, select, projection, aggregation, other relational operation, or ordered and/or nested combination of same over one or more of each set of retrieved data to generate a new data set, for example, represented as a logical table containing a subset of the data in the data space. Operations mentioned above, for example, may be processed together across different maps to form a nested query. For example, one can select a cluster from one projected map, then union to the outliers from another map, and intersect with one column (histogram) that has values smaller than a predefined threshold.

Data querying platform 110 is configured to select the operation or operations and/or the order or nesting of same based on data received at interface application 130 from user input indicating same. In another example, data querying platform 110 can generate the one or more queries or nested queries to retrieve the data based on the data indicators selected and the location of the data they represent (e.g., location in different logical tables in a database, location in various data structures, etc.).

For example, the user input can be a combination of a selection of a "intersect" radio button and two (or more) selections of sets of data indicators (where each selection can contain one or more data indicators) on one or more displays of one or more projected data spaces (e.g., two scatterplots, each plotting a different data space derived from the data source). Data querying platform 110 can receive the data input, identify data in the data store (e.g., rows in logical tables) associated with the selected sets of data indicators, retrieve that data from the data store (e.g., as separate logical tables corresponding to each selection of each set of data indicators), and select a subset of data (e.g., rows) where the subset are the rows that together form an intersection of the data in each logical data table.

The selected subset of data can be used to generate a logical data table. In some embodiments, data querying platform 110 can retrieve the identified data based by generating one or more queries or nested queries to retrieve the data. Data querying platform 110 is configured to generate the one or more queries based on the data indicators selected and the location of the data they represent (e.g., location in different logical tables in a database, location in various data structures, etc.).

Data querying platform 110 is configured to generate data enabling presentation of the data in the logical table. For example, data querying platform 110 is configured to generate data (e.g., instructions) enabling data indicators corresponding to data in that logical table to be augmented (e.g., covered within a shaded overlay, highlighted, bolded, annotated) on one or more displays of projected data spaces (e.g., scatterplots or histograms). Accordingly, data querying platform 110 is adapted to enable a user engaged at interface application 130 to intuitively visualize an inter-correlation of data across one or more displays of projected data spaces, for example, one or more histograms or scatterplots.

This can allow a user to visualize relationship of data (represented by data indicators) on different displays of projected data spaces, for example, that depict different fields, columns, or perspectives of the same data or of data in the same row or column or other specified field in the data source. For example, a user can select the data indicator bar corresponding to two payment orders on a display of the "payment orders" column space.

Data querying platform 110 is configured to receive this input data and identify the rows in one or more logical tables in the data store that have two payment orders in the "payment order" column in the tables. Interface application 130 is configured to augment data indicator bars on other displays of different data column spaces that correspond to other columns in the same rows that have the two payment orders.

As another example, a user can provide input at interface application 130 as a lasso selection (or other selection, such as a square, an ellipsoid, an irregular selection of an area) of data indicators on a scatterplot display of a projected data space. Interface application 130 is configured to transmit the input (i.e., selected data indicators) to data querying platform 110. Data querying platform 110 is configured to identify data in the data store that is associated with the selected data indicators, for example, that were used in the generation of the selected data indicators. Data querying platform 110 is configured to retrieve that associated data and generate a logical table (or other data structure) comprising that associated data.

In some embodiments, data querying platform 110 can retrieve the identified data based by generating one or more queries or nested queries to retrieve the data. Data querying platform 110 is configured to generate the one or more queries based on the data indicators selected and the location of the data they represent (e.g., location in different logical tables in a database, location in various data structures, etc.). Data querying platform 110 is configured to perform relational operations or other retrieval operations (for example, on a non-relational database) on the underlying data store to retrieve a logical table of the selected data. Accordingly, a query is identified based on the selection of the visual area.

Data querying platform 110 generates data enabling presentation of that retrieved data and transmit same to interface application 130 for presentation to a user. For example, the presentation of that retrieved data can be augmentation (e.g., covering within a shaded overlay, highlighted, bolded, annotated) of existing corresponding data indicators on separate displays of a projected data space (e.g., separate scatterplots showing different two-dimensional data spaces of the data source).

This can allow a user to visualize relationship of data (represented by data indicators) on different displays of projected data spaces, for example, that depict different fields, columns, or perspectives of the same data or of data in the same row or column or other specified field in the data source. For example, a user can select a set of data indicators on a t-Distributed Stochastic Neighbor Embedding (e.g., t-SNE) scatterplot generated from the data source. Data querying platform 110 is configured to receive corresponding input data (e.g., indices specifying the rows in a logical table where the data space is stored) and determine the rows, columns, or specified fields in a logical table representation of the data store, where the identified rows, columns, or specified fields contain the data used in the generation of the selected data indicators on the t-SNE scatterplot.

Interface application 130 augments data indicators on other displays of projected data spaces (e.g., scatterplots of different two-dimensional data spaces or histograms of a data column space) that correspond to the identified rows, columns, or specified fields. For example, on a t-SNE scatterplot, a user can select data indicators corresponding to features A and B that appear in a certain row in a logical table in the data store. Data querying platform 110 receives signals representative of this selection from interface application 130 and determine and retrieve that row from the logical table. Data querying platform 110 can generate data (e.g., instructions) allowing data indicators on a different t-SNE plot to be augmented, where those data indicators plot different features derived from the same row in the logical table in the data store.

Data querying platform 110 stores the associations between data indicators and data in one or more logical tables in the data store that were used in the generation of the data indicators. Data querying platform 110 is configured to facilitate selection and augmentation of corresponding data indicators across displays of the same or of different projected data spaces, for example, across a principal component analysis (PCA) scatterplot of data in the data store, a t-SNE scatterplot of data in the data store, independent component analysis (ICA) scatterplot of data in the data store, and/or a histogram of data in a specified data column stored in the data store.

For example, multiple selections of data indicators can be made on the same scatterplot and data indicators can be augmented on the same scatterplot or, alternatively, on a different scatterplot, depending, for example, on the data retrieved from the database by data querying platform 110 (e.g., which can be based on whether a union, intersection, or join operation between the selected data indicators is performed).

As another example, multiple selections of data indicators can be made on two scatterplots each displaying different projected data spaces (e.g., t-SNE scatterplot and a PCA scatterplot) as well as on a histogram of a data column space. Data indicators can be augmented across the two scatterplots, the histogram, and/or other scatterplots or histograms, depending, for example, on the data retrieved from the database by data querying platform 110 (e.g., which can be based on whether a union, intersection, or join operation between the selected data indicators is performed).

In some embodiments, data querying platform 110 receives data from interface application 130 encoding instruction to process the selected data indicators or use the selected data indicators to perform a relational database operation (e.g., intersection, union) over their corresponding data in the data store, to generate a different or useful set of data or set of augmented data indicators on a display at interface application 130.

For example, a user may select data indicators corresponding to a specified column in a row in a logical table representation in the data store. Data querying platform 110 is configured to retrieve data corresponding to a different column in the same row in the logical table, where the different column is selected based on other data received from interface application 130. The other data can be an identification of the other projected data spaces currently displayed at interface application 130, for example.

In some embodiments, different operations (e.g., relational operations) can be applied to different selections of data indicators. Nesting of different selections across different projected data spaces or different displays of projected data spaces is possible. The operation type, order each operation is performed, and which set of selected data indicators each operation is performed on can be determined by data querying platform 110 based on data input from a user engaged at interface application 130. For example, a user engaged at interface application 130 can select a set of data indicators from one projected map, union to outliers from another map, and intersect with one column (represented by a histogram display) that has values smaller than a threshold.

The threshold can be defined by user input, for example, can be a numerical value in a specified variable corresponding to a field in a logical table representation of the data that the data indicators represent. In another example, the threshold can be defined dynamically based on additional user input or generation of new data or data sets by data querying platform 110, for example, if query construction unit 123 retrieves data or performs query operations on a data source.

The user can provide this input by selecting data indicators and indicating an operation to be performed successively. The input is converted into a selected processing area, and data querying platform 110 is configured to receive the input from interface application 130 and successively retrieve data in the data store associated with each set of selected data indicators and perform the specified operations on the data associated with the specified data indicators.

Data querying platform 110 can transmit data encoding a result to interface application 130 for display or for augmentation of existing data indicators corresponding to the result on existing scatterplots and/or histograms. In another example, the operation type, order each operation is performed, and which set of selected data indicators each operation is performed on can be determined by data querying platform 110 based on one or more queries or nested queries generated by data querying platform 110.

Data querying platform 110 can generate the one or more queries based on the data indicators selected and the location of the data they represent (e.g., location in different logical tables in a database, location in various data structures, etc.).

Basing the retrieval of data from a data store on selection of data indicators projected on a visual display allows additional or more complex datasets to be generated. Data querying system 100 can provide a computationally simpler and more intuitive to use means for accessing and generating data relevant for particular purposes than could be possible without engaging with the data indicators presented at interface application 130. Data querying system 100 can enable the presentation of how different views of the same data space are inter-correlated.

Data querying system 100 receives free-form selection of data indicators that correspond to values in the underlying data space and visual display of the data or related data on different projected data spaces. A user interfacing with data querying system 100 can also retrieve sets of data that would not be accessible in a single selection via a direct query on the data store using relational operations.

Further, embodiments described herein can provide data indicators on displays of structured data projections that are paired with data querying system 100 functionality described herein. The arrangement and denotation of the data indicators allow for visual construction of complex queries that allow a user to access a data space and/or generate new datasets (e.g., more relevant) without coding or a priori knowledge of the database schema or variable space of the underlying data store. This can allow users engaged with data querying system 100 to more efficiently and accurately query data in a data store.

Interface application 130 enables a user, for example, via a display, interactive display, keyboard, mouse, microphone, touchscreen, haptic device, or other sensory apparatus. Interface application 130 is adapted to transmit and receive signals or data from such devices and transmit data to data querying platform 110.

In some embodiments, interface application 130 can process data before sending the data via network 140 and/or to data querying platform 110. In some embodiments, data querying platform 110 can connect to interface application 130 over a network 140 (or multiple networks). Network 140 (or multiple networks) is capable of carrying data and can involve wired connections, wireless connections, or a combination thereof. Network 140 may involve different network communication technologies, standards and protocols, for example. Network 140 can include a combination of message buses, intranet, internet, or distributed or cloud architecture, for example. External systems 150 can receive data from an interface application 130 and/or data querying platform 110 via a network 140 (or multiple networks).

In some embodiments, external systems 150 can connect to data querying platform 110, for example, via network 140 (or multiple networks). External systems 150 can be one or more databases or data sources or one or more entities that aggregate or process data. For example, an external system 150 can maintain a data store accessible by data querying platform 110. Data querying platform 110 can retrieve data from the data store for processing and/or presentation to a user requesting associated data indicators on a display at interface application 130. In some embodiments, external systems 150 can store associations between data indicators presented at interface application 130 and data in a data store.

Figure 2:
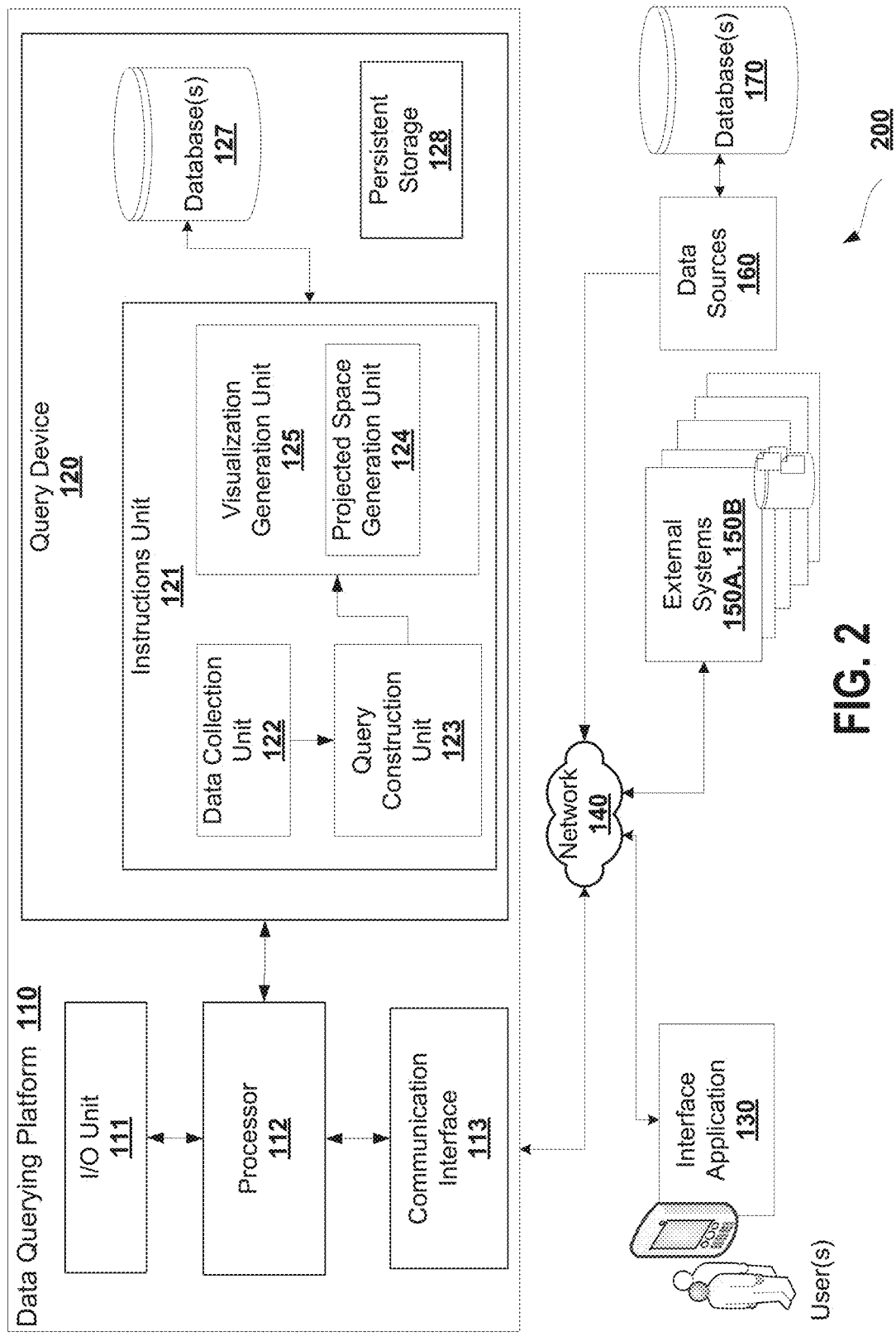
FIG. 2 is a view of an example data querying platform according to some embodiments.

FIG. 2 is a view of an example data querying platform 110 and query device 120 according to some embodiments. A data querying platform 110 can include an I/O Unit 111, processor 112, communication interface 113, and query device 120. The units shown in FIG. 2 are example units and are implemented using a combination of hardware and software, including logical processing components that are implemented by a hardware processor and electronic circuits.

The data querying platform 110 can, in some embodiments, be a server operating within a data center or coupled thereof, or, in other embodiments, be provided in the form of a series of distributed computing resources operating in concert as a cloud computing implementation.

The data querying platform 110 controls processor 112 to retrieve a plurality of higher-dimensionality data points from a data storage or computer memory, for example, from databases 170, which represent data from data sources 160.

The data querying platform 110 controls display devices at interface application 130 to render different views based on a same set of higher-dimensionality data points. The higher-dimensionality data points are transformed to a reduced-dimensionality data point in accordance with a transformation function for each view. Transformation functions can include truncations, concatenations, convolutions, linear transformations, non-linear transformations, etc., and various approaches may be utilized to indicate which dimensions should be selected or mapped and which truncated, and combinations thereof (e.g., principal component analysis).

Each of the views are distinct from one another, and have different transformation functions. For each view of one or more distinct views, each point of the plurality of higher-dimensionality data points into a reduced-dimensionality data point in accordance with a transformation function associated with the view, the corresponding plurality of reduced-dimensionality data points defining a constellation of reduced-dimensionality data points associated with the view. The constellation is what is rendered on the displays of interface application 130, and can include location coordinate pairs/triplets (X, Y; X, Y, Z), and other types of coordinate systems are possible (e.g., spherical coordinates, cylindrical coordinates, polar coordinates, and additional coordinate systems are possible (e.g., mappings using functions established by Jacobian approximation).

The views can further include scatterplots, histograms, bar charts, pie charts, etc., and similarly, reduced-dimensionality data points are established by mapping degrees of freedom of the types of plot to the transformed reduced dimensions.

The interface application 130 is controlled to render one or more display layouts by visualization generation unit 125, which maps the dimensions to the display layouts using projected space generation unit 124. Each display layout corresponds to a view of the one or more distinct views, and each display layout rendering the constellation of the reduced-dimensionality data points associated with the view.

For each of the one or more display layouts, an input selection (e.g., one or more selected areas having underlying points established, for example, using rectangular selections, irregularly shapes using a lasso). The input selections need not be continuously selected in the shape and additional selections may be made that allow for a discontinuous selection. For histogram views or other types of plots, the user may also simply select specific bars or visual elements for inclusion. Selections can also be made through selecting visual elements representing areas for selection, such as slices of a pie chart, bars of a bar graph/histogram, etc. A range may be selected.

The input selection is translated by query construction unit 123 to indicate the corresponding set of selected higher-dimensionality data points that are selected by a user for each view. In an embodiment, the data structure storing the plurality of higher-dimensionality data points is augmented (e.g., extended) with additional dimensions that correspond (or are based on) to the number of the one or more distinct views. For example, each view may have its own additional dimension, or in some embodiments, there may be n–1 additional dimensions, where n is the number of views. In another embodiment, the additional dimensions are only extended where a view has associated selections—for example, if there are 15 views, and the user has only made selections on 3 of the views, there may only be 2 or 3 additional dimensions added. Reducing the number of additional dimensions may be helpful in reducing storage requirements where there are a large number of points.

The additional dimensions are extended on the data structure. The extended dimensions may be added directly to the data sets stored on database 170, or, in some embodiments, tracked separately in database 127 on a separate input selection augmentation table data structure with references to the underlying data on database 170 or copies of the data with extensions thereof on database 127.

The plurality of additional dimensions are utilized to track whether each higher-dimensionality data point is selected in a particular view of the one or more distinct views. For example, the additional dimensions may include a Boolean field indicating whether the specific row associated with a point is selected (e.g., 1 if selected or 0 if not selected). The additional dimensions are not limited to storing Booleans and other data can be stored, for example, additional metadata indicating in which order the selections were made, a reason code for selection, among others.

The query construction unit 123 performs one or more data operations against the sets of selected higher-dimensionality data points corresponding to each of the distinct views to establish an output data structure storing a subset of the plurality of higher-dimensionality data points. These operations can include unions, joins, intersections, among others, and in some embodiments, the operations utilize the plurality of additional dimensions to establish the subset of the plurality of higher-dimensionality data points based on the operations based on the visually selected higher-dimensionality data points of each view.

Where an intersect is used, the data scientist is able to view only those higher-dimensionality data points which were selected across all views, which is useful, for example, in visually attempting to determine root cause analysis or hypothesis validation. More complex operations are also possible, for example, establishing a query based that uses selections from each view differently. For example, if there are three views, V1, V2, V3, each having a corresponding selection, a query operation can include (V1 OR V2) AND NOT V3.

In some embodiments, the visualization generalization unit 125 utilizes the plurality of additional dimensions to modify visual display aspects of the visualization provided by interface application 130. The modification can include applying visual masks or modifying colors, opacity, size, etc., of data points shown based on selections on other views, the selections being tracked in the plurality of additional dimensions. For example, selections on view 1, shown in the set of points V1, can be shown through modified opacity of points when the user is on view 2.

Similarly, all non-selected points, etc., may have reduced opacity/increased transparency, etc. to further highlight the points shown on other dimensions. For example, on histogram type views, the universe of points can be shown in a first visual characteristic (e.g., clear bars) and the selected points of other views can be shown in a second visual characteristic (e.g., having a color, shading or hatching effect). In a further embodiment, a difference between the universe of points and the selected points of other views can be shown in a third visual characteristic (e.g., a shadow bar).

A visual control, such as a toggle-able slider bar or interactive element can be used to trigger this masking feature on and off as a user may seek to first review the views without bias imported from selections on other views.

The output of query construction unit 123, in some embodiments, is a data file encapsulating the entirety of the subset of the higher-dimensionality data points, or reference identifiers, such as pointers associated thereof. In some embodiments, the augmented plurality of additional dimensions are included in the data file such that a subsequent user is able to re-generate the views and the selections thereof in relation to each view to re-trace, as digital breadcrumbs, how the subset was originally generated.

In some embodiments, the output is used for iteratively conducting visual nesting operations (e.g., used as the new set of the universe of higher-dimensionality points) for further analysis. For example, a universe of 50,000 data points can be under analysis, and each subsequent round of selection may lead to a reduction in a factor size of 10 until 50 data points remain.

A data querying platform 110 interconnects with one or more interface applications 130, external systems 150, data sources 160, and/or databases 170. This connection may be over a network 140 (or multiple networks). Data querying platform 110 receives and transmits data from one or more of these via I/O unit 111. When data is received, I/O unit 111 transmits the data to processor 112.

Each I/O unit 111 enables the data querying platform 110 to interconnect with one or more input devices, such as a keyboard, mouse, camera, touch screen and a microphone, and/or with one or more output devices such as a display screen and a speaker.

A processor 112 executes instructions in instructions unit 121 to configure query device 120, and more particularly, data collection unit 122, query construction unit 123, visualization generation unit 125, and projected space generation unit 124. For example, instructions unit 121 can be memory. In other embodiments, a processor 112 can interconnect with query device 120 to provide signal to initiate instructions unit 121 and/or receive signal from instructions unit 121 indicating instructions have been executed. For example, instructions unit 121 can be a device providing hard-coded signals, for example. In some embodiments, processor 112 can interconnect with a combination of memory and other hardware to execute instructions.

A processor 112 includes at least one of microprocessor or microcontroller, a digital signal processing (DSP) processor, an integrated circuit, a field programmable gate array (FPGA), a reconfigurable processor, or a combination thereof.

Instructions unit 121 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Query devices 120 can include instructions unit 121, databases 127, and persistent storage 128.

Data querying platform 110 can include other hardware that configures instructions unit 121.

Each communication interface 123 can enable the data querying platform 110 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others.

The data querying platform 110 can be operable to register and authenticate users (using a login, unique identifier, and password for example) prior to providing access to applications, a local network, network resources, other networks and network security devices. The platform 110 may serve one user or multiple users.

Databases 127 may be configured to store information associated with or created by the query device 120. Storage 127 and/or persistent storage 128 may be provided using various types of storage technologies, such as solid state drives, hard disk drives, flash memory, and may be stored in various formats, such as relational databases, non-relational databases, flat files, spreadsheets, extended markup files, etc.

Data collection unit 122 can receive data from interface application 130 via communication interface 113. Data collection unit 122 can receive data indicating one or more data indicators selected on a display at interface application 130, for example. The data indicators may be selected on one or more different data space projections, for example, on a column data space of an underlying data store containing logical tables or on data spaces corresponding to a PCA, ICA, or t-SNE transformation of the data space.

Data collection unit 122 can also receive one or more indications of operations to perform in relation to the one or more data indicators. For example, data collection unit 122 can receive an indication to return data associated with one or more sets of selected data indicators or a join, union, intersection, except, select, projection, aggregation, other relational operation, or ordered and/or nested combination of same.

The data indicators can be selected from different projected data spaces or from the same one. A projected data space can be presented on one or more different displays, for example, a scatterplot, histogram, chart, or pie view. Data collection unit 122 can process, aggregate, transform, order, and/or provide data to data association unit 123.

Query construction unit 123 associates data indicators with data from an original data source that was used in their generation and can retrieve the data. Association and/or retrieval of data can involve operations on one or more logical table representations of the data, for example, where data is stored in a relational database. Data can be stored in other representations, data structures, and/or storage units. For example, an original data source can be logically represented in storage as a linked list, tree, array, map, stack, queue, or graph, for example.

As an example, query construction unit 123 is configured to receive data corresponding to selected data indicators from data collection unit 122. Query construction unit 123 can retrieve a data space from a data store, for example, stored in databases 127, databases 170, persistent storage 128, data sources 160, or external systems 150, that is associated with or that corresponds to the one or more sets of selected data indicators. In some embodiments, query construction unit 123 is configured to receive data encoding one or more associations between the selected data indicators and data in a data store, for example, that the data indicators represented on a projected data space of the data store at interface application 130.

Query construction unit 123 is configured to determine the data in the data store that is associated with the selected data indicators, for example, that were used in the generation of the selected data indicators. For example, query construction unit 123 is configured to record row indices of the selected data indicators or of the associated data, where the row indices correspond to indices from a "column data source" data structure, for example, from the Python Bokeh™ library. Query device 120, external systems 150, data sources 160, or interface application 130 is configured to store the row indices and their correspondence to data indicators.

For example, interface application 130 receives data encoding data indicators selected by a user at a display device. The data encoding a particular data indicator can include row indices of a column data source data structure from a library (e.g., Python Bokeh™ library) that corresponds to the data that the data indicator denotes or was generated from. Interface application 130 can transmit this data (e.g., including a row index to the relevant data) encoding each selected data indicator to data querying platform 110 including for query construction unit 123 to use to retrieve the data.

Query construction unit 123 retrieves the associated data, for example, using the row indices, and generates a logical table comprising that associated data. Query construction unit 123 can perform relational operations or other retrieval operations (for example, on a non-relational database) on a data space to retrieve a logical table of the selected data. The associated data is stored in one or more different logical tables in a data store. Query construction unit 123 can retrieve and assemble the associated data from different logical tables. For example, query construction unit 123 can determine the data corresponding to a union, intersection, join, except, select, projection, aggregation, other relational operation, or ordered and/or nested combination of same over one or more logical table representations of the data source.

The associated data retrieved is the data used in the generation of one or more selected data indicators, for example, the data that the one or more selected data indicators represent. The associated data retrieved can be related data, for example, data in the same row as the data that the selected data indicators represent. Query construction unit 123 can select associated data to retrieve based on data input received from interface application 130 or based on instructions received from external systems 150 or data querying platform 110. For example, data querying platform 110 may be configured to retrieve only the data the data indicators represent as the associated data or data querying platform 110 may determine associated data dynamically based on the request received from interface application 130.

Query construction unit 123 can provide data retrieved from an original data space, for example, represented as one or more logical tables in one or more databases, to visualization generation unit 125 or projected space generation unit 124.

Data querying platform 110 can store an original data space, for example, in one or more local databases 127, or access an original data space, for example, stored at data sources 160, databases 170, external systems 150, or at interface application 130 over a network 140 (or multiple networks).

Data querying system 100 can structure storage of an original data space in query device 120, at data sources 160, or at external systems 150. The data is, for example, stored in a logical table format, with rows representing data entries and columns being features of an entry. For example, the data can be stored using the "column data source" data structure from a library (e.g., the Python Bokeh™ library). Projections of the original data space can be computed, for example, by projected space generation unit 124, and stored to augment the data table (e.g., for the scatterplots).

Visualization generation unit 125 is configured to generate data enabling the presentation or display of data represented as data indicators on visual elements such as histograms, scatterplots, charts, or graphs. For example, the data can correspond to data that a user has requested, for example, by selection of data indicators over one or more displays of projected data spaces. Visualization generation unit 125 transmits data encoding data indicators to interface application 130 for presentation to a user, data encoding one or more display elements, such as a histogram, scatterplot, chart, graph, or map, and data encoding an association between the data indicators and the display elements (e.g., indicating the location the data indicators should be displayed on the display elements). Plotting of data on one or more display elements for presentation to a user is thus enabled.

Visualization generation unit 125 includes projected space generation unit 124. Projected space generation unit 124 is configured to generate data enabling the presentation or display of data as a projected data space of an original data space. For example, projected space generation unit 124 processes data retrieved from an original data space stored in databases 127, persistent storage 128, data sources 160, databases 170, or external systems 150. Projected space generation unit 124 uses one or more machine learning algorithms to generate a reduced-dimensional data space from high-dimensional data in the original data space.

The machine learning algorithms can determine features in the data that distinguish subsets of the data in useful ways, for example, according to a parameter or field (or combination). The features of data, for example, of each row in a logical table representation of the data space, can be transmitted to interface application 130 for generation of a scatterplot display with data indicators representing the plotted features, where a user can intuitively select, engage with, and view the features.

Projected space generation unit 124 generates data enabling the generation of displays (e.g., scatterplots, histograms, charts, pies) of projected data spaces (e.g., corresponding to a PCA, ICA, t-SNE analysis or data space corresponding to a single column in a logical table representation of the original data space) with data indicators (e.g., visual markers, bars, dots, lines, bullets) representing each value in the projected data space.

Visualization generation unit 125 and/or projected space generation unit 124 can generate data (e.g., instructions) allowing a display or plot depicting an original data space, a subset, or a projection of same to be presented at interface application 130. For example, projected space generation unit 124 can load an original data space into a "column data source" data structure.

Unsupervised machine learning algorithms can be performed to augment the data structure with more projection features. All plots or displays share a data structure. For example, all plots or displays can depict data indicators that correspond to this same data structure. Scatterplots can be generated from two columns (projection features), and a marginal distribution can be generated from one of the original columns.

Visualization generation unit 125 and/or projected space generation unit 124 can transmit data enabling generation of scatterplots or other displays of a projected data space generated from the original data space.

Data that projected space generation unit 124 can transmit to interface application 130 for presentation to a user can correspond to projected data spaces for the user to perform a selection on or can correspond to data that a user has requested, for example, by selection of data indicators over one or more displays of projected data spaces. For example, a user can select one or more sets of data indicators and interface application 130 can highlight the selected data indicators on the displays that the data indicators were selected on as well as augment corresponding data indicators on other displays of projected data spaces.

In any case, interface application 130 can transmit data identifying the selected data indicators to data querying platform 110, external systems 150, and/or data sources 160 for storage. The data can be used by researchers or developers or other users to identify the data that the data indicators represent, even if no additional data is retrieved and presented to the user. Projected space generation unit 124 can also generate data encoding which data indicators on displays at interface application 130 to augment (e.g., bold, shade, highlight, colour a specific colour, annotate, enclose, box, visually depict). Interface application 130 can receive this data and augment the respective data indicators accordingly.

An example according to some embodiments of data querying system 100 can be described as follows. Interface application 130 receives selections of data indicators included in a request for one or more operations on a data space from a user through different sensors. For example, interface application 130 receives data corresponding to a selection of data indicators presented on a display device.

Data encoding a data indicator can include encoding for information such as coordinates, numerical values, labels denoting identity, row indices corresponding to a column data structure in the library (e.g., Python Bokeh™ library), or other values, for example, indicating a data value in a projected space plotted on a scatterplot display at interface application 130. Interface application 130 can receive the data and store the data at interface application 130 or transmit the data to a data querying platform 110. Data querying platform 110 receives the data at communication interface 113 and instructions can be executed (e.g., by processor 112 or other hardware) in instructions unit 121 (e.g., memory).

Instructions unit 121 includes data collection unit 122, which can be configured by the instructions to process data received from interface application 130, for example, data encoding one or more data indicators or one or more sets of data indicators. Data collection unit 122 removes metadata or organizes the data to facilitate query construction, for example, and be configured to provide the processed data to query construction unit 123. Query construction unit 123 can retrieve relevant data according to the user request and/or selection of one or more data indicators.

For example, the user can request a union of two sets of selected data indicators. Visualization generation unit 125 can, as described above, generate data indicating that particular data indicators on different displays (e.g., histograms, scatterplots) be augmented, where the particular data indicators correspond to the union of the two sets of selected data indicators be augmented. In another example, the user can request display of a particular reduced-dimensional data space (e.g., t-SNE data space) of the original data source. Projected space generation unit 124 can generate data encoding the reduced-dimensional data space from the original data space, as described above.

Figure 3:
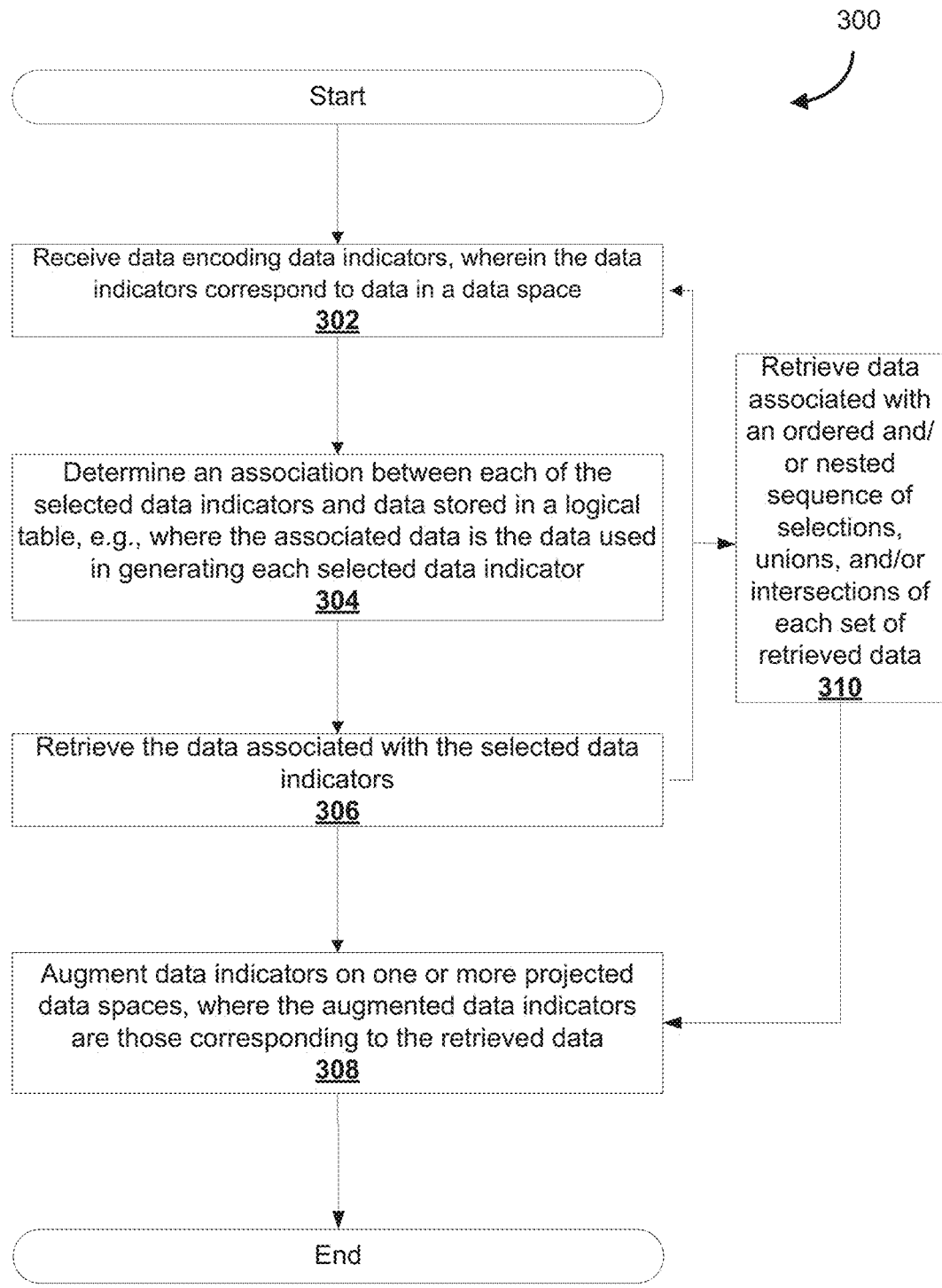
FIG. 3 is an example workflow of some embodiments of data querying system, according to some embodiments.

FIG. 3 is an example workflow 300 according to some embodiments of data querying system 100.

At 302, interface application 130 receives data encoding data indicators of data in one or more displays of data from a data source. The display of data can be a scatterplot or a histogram of a projected data space or portion of an original data space, for example. In an example, the data received can include row indices of a "column data source" data structure from the library (e.g., Python Bokeh™ library), in which data corresponding to the data indicators is stored. The stored data can be, for example, an original data space and/or data generated by projected space generation unit 124 based on the original data space.

At 304, data querying platform 110 determines an association between each of the selected data indicators and data stored in a logical table, e.g., where the associated data is the data used in generating each selected data indicator. For example, an association may be defined by row indices in a column data source data structure from the library (e.g., Python Bokeh™ library) or values in a linked list, array, map, stack, logical table, hash table, pointers, relational database, non-relational database, or other data structure.

At 306, data querying platform 110 retrieves the data associated with the selected data indicators. In some embodiments, data querying system 100 can define a relationship (or several) that identifies associated data. For example, associated data can be the data in the same row as the data used in the generation of the data indicator.

At optional step 310, data querying platform 110 repeats steps 302, 304, and 306 and retrieves data associated with an ordered and/or nested sequence of selections, unions, and/or intersections of each set of retrieved data. The order, nested sequence, and/or operation performed at each step is based on data input provided by interface application 130, for example, the that a free-form selection of data indicators on a scatterplot display of t-SNE values of the data space correspond to. As the selection of data indicators is not confined by the logical representation (e.g., logical table representation) of the data in an underlying data store, a single selection can indicate retrieval of corresponding data stored in different logical tables and retrievable by a union, join, intersection, or other relational or non-relational operation on the data store.

At 308, data querying data querying platform 110 augments data indicators on one or more projected data spaces, where the augmented data indicators are those corresponding to the retrieved data. The data space can be a projected data space of an original data space. In an example, for each retrieved set of data, data querying system 100 retrieves data associated with an intersection of each set of retrieved data.

In an example, for each retrieved set of data, data querying system 100 retrieves data associated with a union of each set of retrieved data.

In another example, for each retrieved set of data, data querying system 100 retrieves data associated with an ordered and/or nested sequence of selections, unions, and/or intersections of each set of retrieved data. In an example, data querying system 100 retrieves data associated with an ordered and/or nested sequence of operations on each set of retrieved data.

In another example, the projected data space is a reduced-dimensional space of a hyper-dimensional data space. In another example, the reduced-dimensional space is generated from the hyper-dimensional data space using one or more machine learning algorithms. In another example, the projected data space is a representation of a single column in the logical table. In another example, the data is selected by visual indicators on the projected data space. In another example, the data associated with the selected data indicators are displayed on the projected data space and/or one or more other projected data spaces. In another example, indicators are generated on one or more other projected data spaces, the indicators augmenting second data indicators on the one or more second projected data spaces, the second data indicators generated from a dataset in the data space, the dataset corresponding to data associated with the selected data indicators. In another example, the projected data space is displayed as a scatter-plot, map, histogram, chart, or table.

Data querying system 100 can provide visual construction of arbitrarily nested conjunctive and disjunctive operations for data querying. Data querying system 100 is configured to enable visual construction of complex queries using arbitrary conjunctive and disjunctive operations. In addition, these queries can be applied both on original data columns and their projections.

Figure 4:
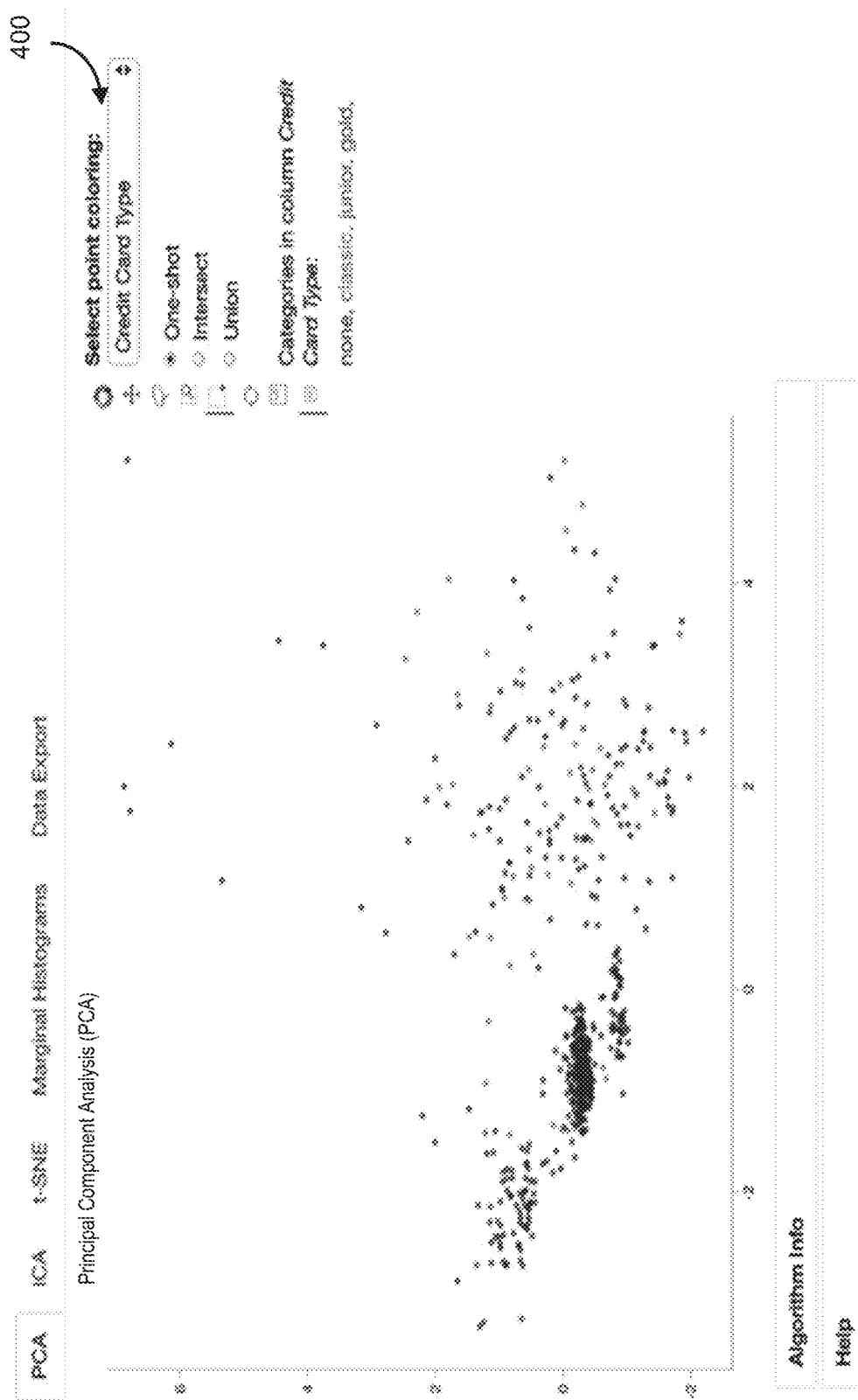
FIG. 4 is a diagram of an example interface display according to some embodiments.

FIG. 4 is a diagram 400 of an example interface display at interface application 130. Interface application 130 enables selection of data from its projections. Interface application 130 can automatically project the data from an original high-dimensional data space to a two-dimensional space (e.g., using three unsupervised machine learning algorithms) that can be visualized using a scatter plot.

Figure 5:
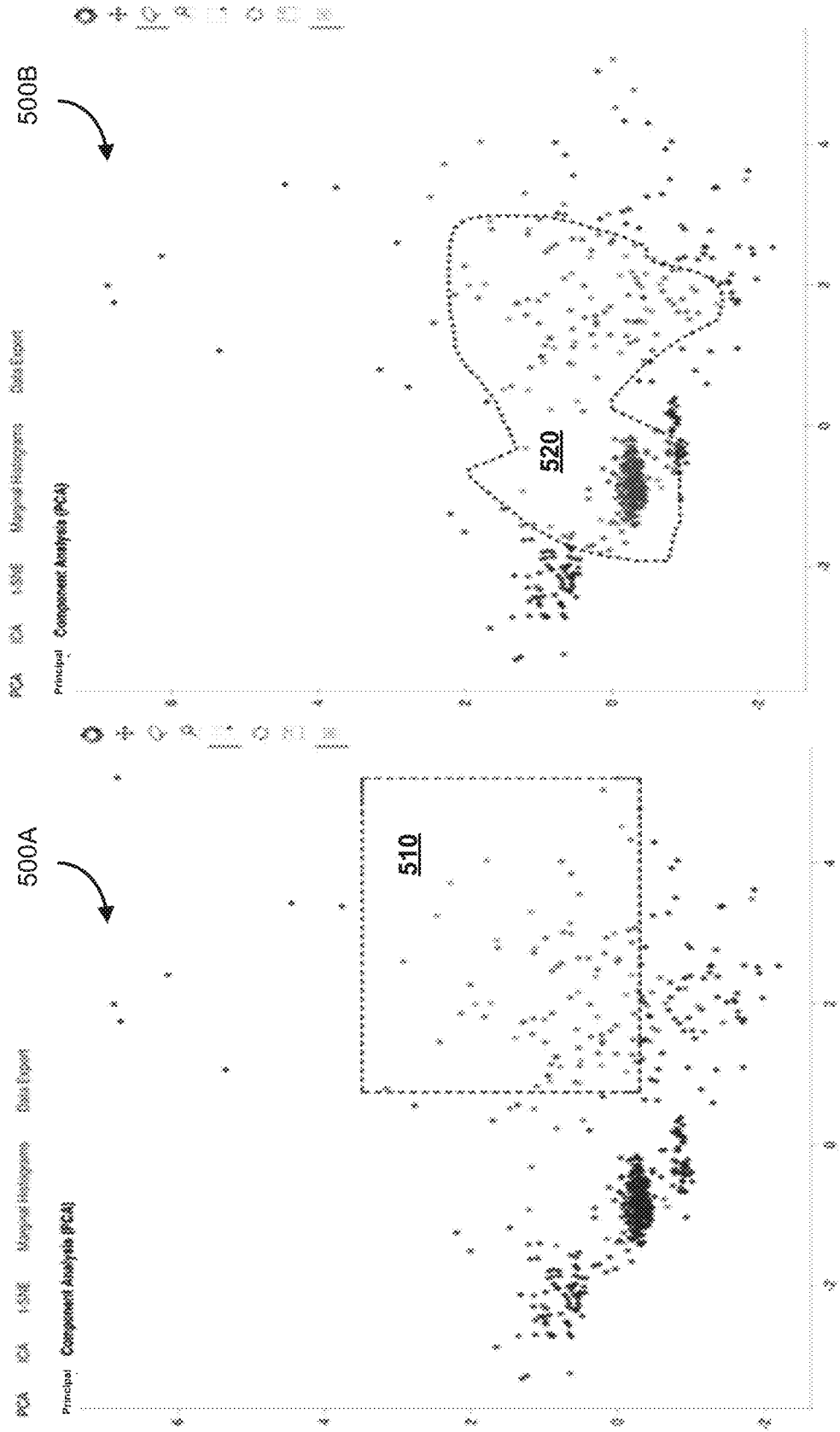
FIG. 5 is a diagram of example selections on an interface for data querying system according to some embodiments.

On the projected map, one can perform selections, for example, box and lasso selections as shown in FIG. 5.

FIG. 5 shows two separate views 500A, 500B, a first view on the left, and a second view on the right. As noted in some embodiments, operations on view 500A may affect the visualization on 500B, and vice versa.

In FIG. 5, the points have different colors and accordingly have three dimensions associated with them, an X coordinate, a Y coordinate, and a color. For example, this can extend from SQL queries in the sense that SQL does not operates visually on the projected data space and SQL does not allow irregular types of selections like the lasso selection. A user engaged at interface application 130 can select via labelled tabular interface elements a projected space to view. For example, PCA, ICA, t-SNE, and column data space representations of the same original data space (or portions thereof) can be viewed. The user can select via radio button interface elements the type of operation to be performed on the selected data indicators.

For example, the user can indicate data querying platform 110 to retrieve data corresponding to the selected data indicators, an intersection of two or more selections of data indicators, a union of two or more selections of data indicators, another relational or non-relational operation in relation to selected data indicators or subsets of same, or a nested sequence of same. This interface design can enable construction of complex queries without knowledge of a database schema or variable space of the underlying data store. This provides an accessible portal to data for its analysis, research, or use, where accessibility is not limited to trained personnel.

Interface application 130 can receive data encoding selections or input from a user. For example, interface application 130 can receive row indices or coordinates corresponding to data indicators selected on one or more displays of one or more projected data spaces, for example, a scatterplot of a PCA space of the original data source, a scatterplot of a t-SNE space of the original data source, and a histogram of a specified column or field in a logical table representation of the original data source. The row indices can correspond to a column data source data structure in the library (e.g., Python Bokeh™ library), for example, that can provide an association between the selected data indicators and the data or values represented by the data indicators. As other examples, the data can be stored in one or more various data structures including linked lists, maps, databases, logical tables, trees, arrays, where the data structure is selected for optimization of retrieval or sorting, for example.

FIG. 5 is a diagram of an example box 510 and lasso 520 selection of data indicators on separate displays of a PCA transformation of the original data space. Such selections can correspond to data in different logical table representations of the projected data space, for example. A user is not limited by knowledge of the database schema or variable space in querying the data, for example.

In some embodiments, interface application 130 enables selection of data from an original column space. Interface application 130 can allow for SQL-like operations in a more visual manner.

Figure 6:
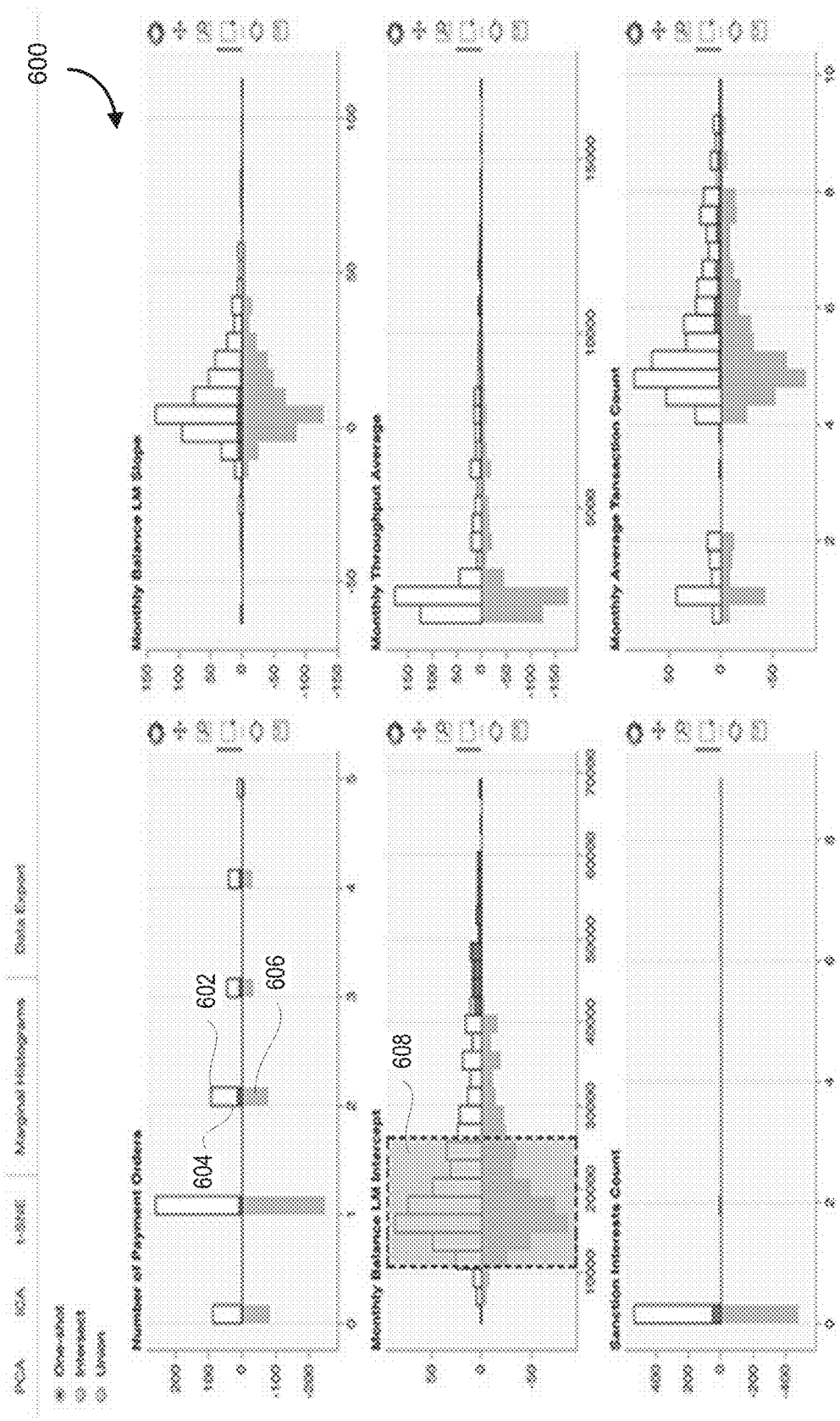
FIG. 6 is a diagram of example histogram displays of a data space at an interface of data querying system according to some embodiments.

FIG. 6 is a diagram of example plotted histograms 600 of original data columns in the original data space. Selection of data indicators on a histogram can request an equivalent retrieval (e.g., where equivalence is in the data retrieved) as a SQL query with a WHERE clause, but without knowledge of the underlying database schema or variable space, for example. Once a selection is made, the corresponding bins can be highlighted across different histograms, which can intuitively provide the user with the inter-correlation of the data column space. All plots displayed at interface application 130 are linked, for example, correspond to or are associated with the same original data space in one or more databases. A user can refer back to the projected plots to explore. As shown in FIG. 6, the universe of points can be shown in a first visual characteristic (e.g., clear bars 602) and the selected points of other views can be shown in a second visual characteristic (e.g., having a color, shading or hatching effect 604). In a further embodiment, a difference between the universe of points and the selected points of other views can be shown in a third visual characteristic (e.g., a shadow bar 606). Multiple bars can also be selected at a histogram view at 608.

Figure 7A:
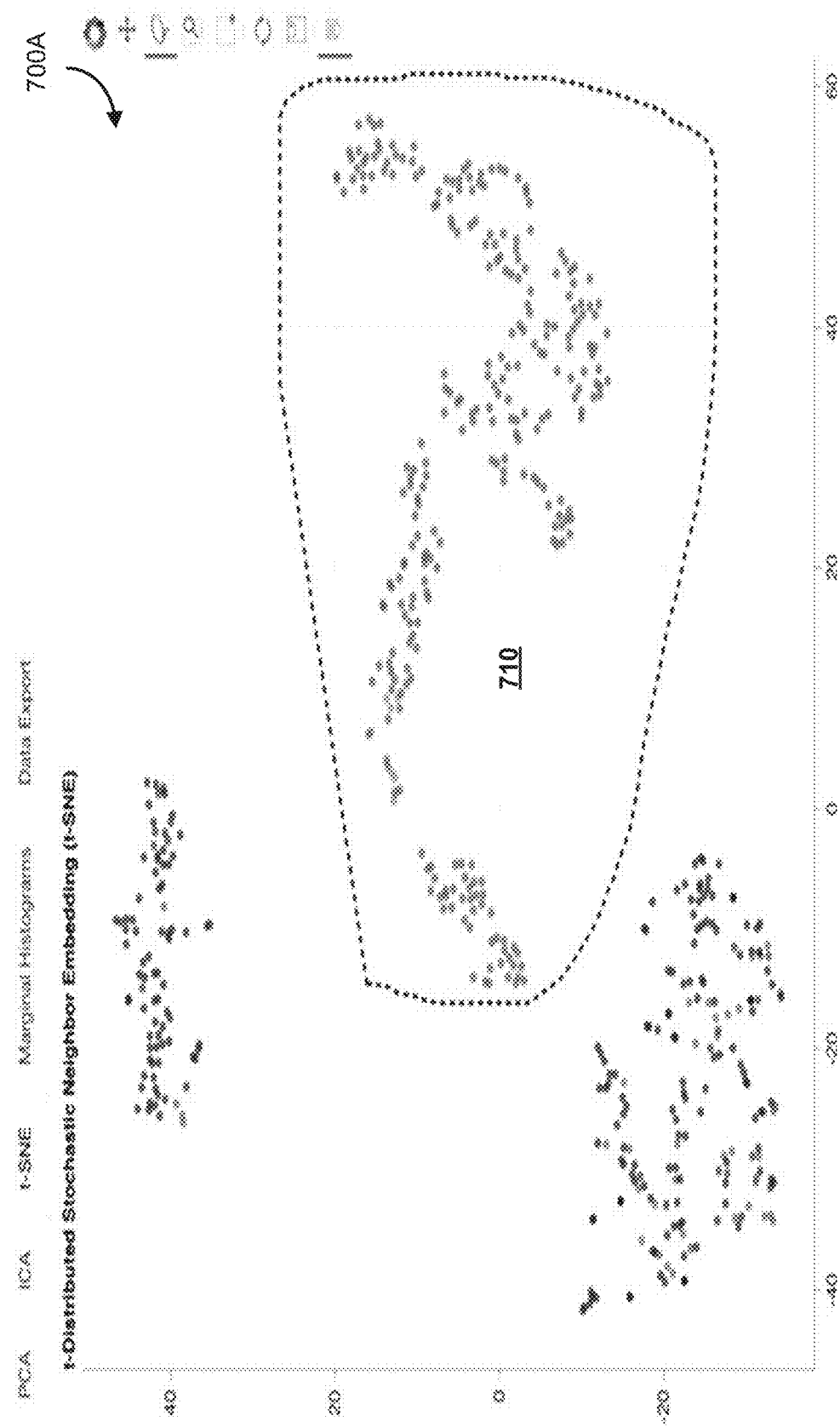
FIG. 7A is a diagram of a display at an interface of data querying system according to some embodiments.
Figure 7B:
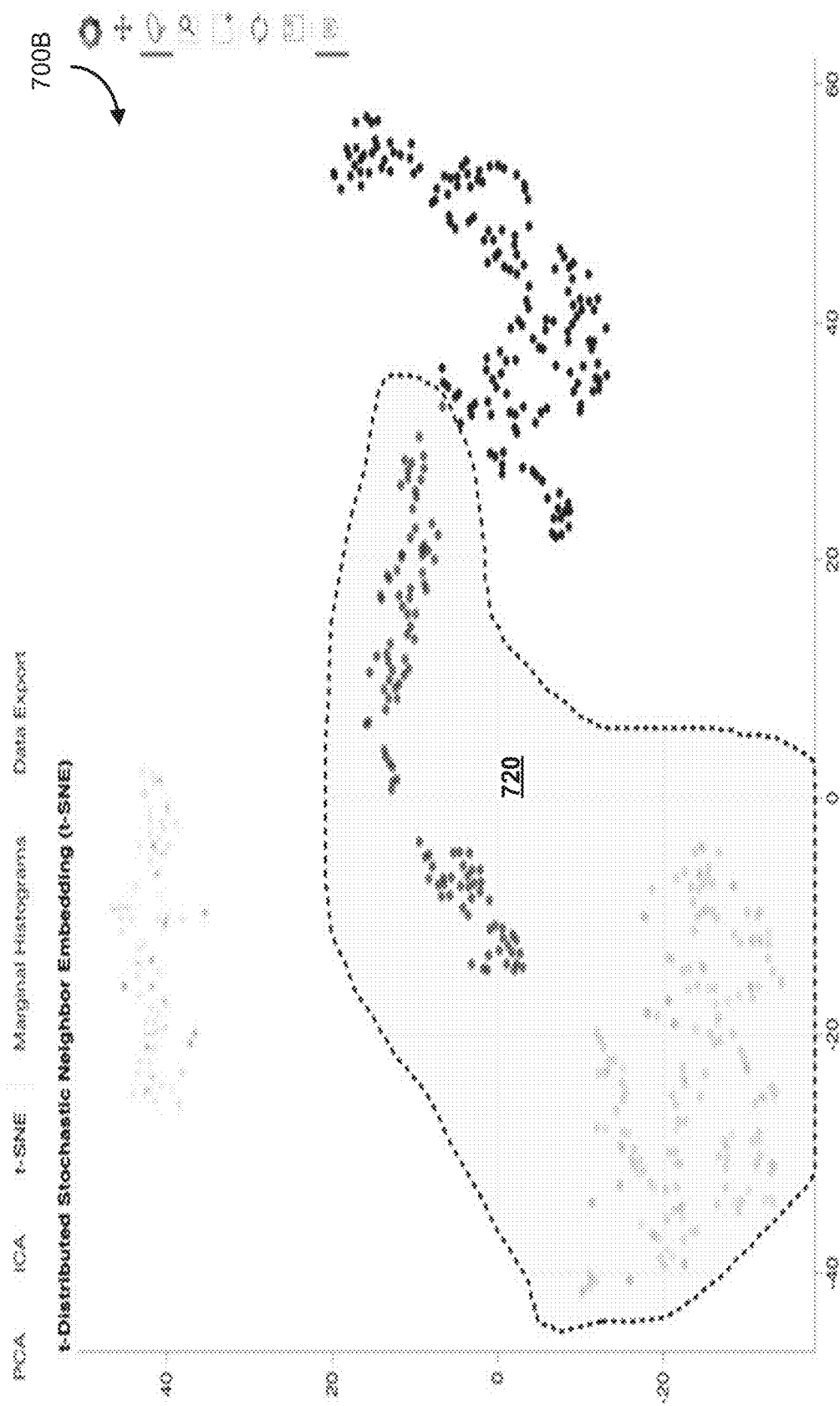
FIG. 7B is a diagram of a display at an interface of data querying system according to some embodiments.

Interface application 130 enables intersect of selections. For example, this functionality can behaves like the disjunctive clauses in SQL (e.g., where similarity is in the data retrieved). FIG. 7A and FIG. 7B are each plot diagrams 700A and 700B, respectively, of an example selection 710 and 720, respectively, on the same plot or display with the intersect selection mode on. When the intersect selection mode is on, a user engaged at interface application 130 can select the intersect of multiple mouse drags. This operation is not only available on the same plot or display, it is possible to do it across different maps and histograms, supporting extremely complex queries not feasible using SQL.

Figure 7C:
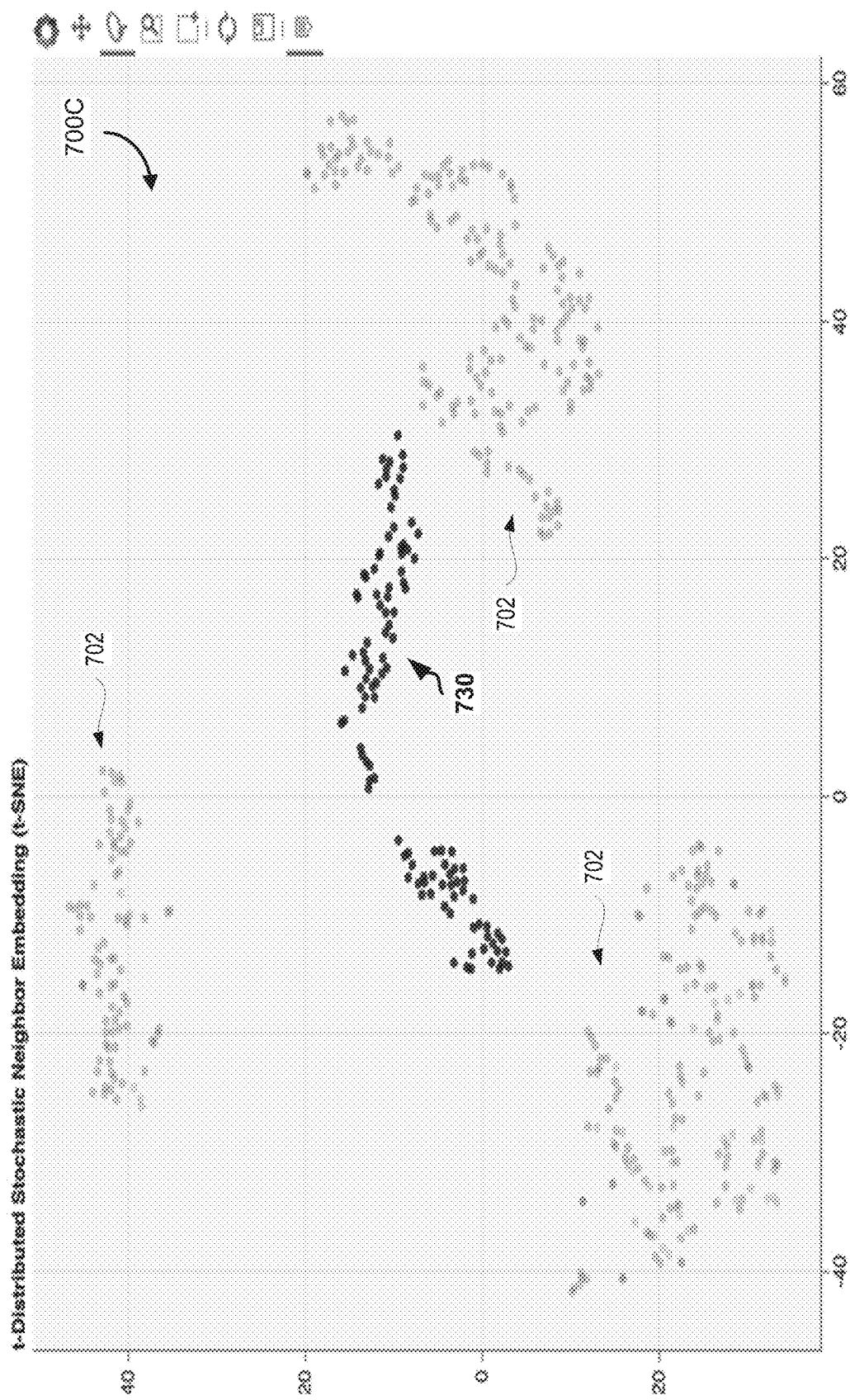
FIG. 7C is a diagram of a display at an interface of data querying system according to some embodiments.

FIG. 7C is an example plot diagram 700C of a result 730 of the selections 710 and 720 depicted in FIG. 7A and FIG. 7B. The data indicators corresponding to the intersection of the data that was selected is augmented in FIG. 7C. This provides the user with intuitive visualization of the intersect of the data underlying their selections of two sets of data indicators. In FIG. 7C, a masking visual effect is shown in relation to elements 702, reducing their opacity to further highlight result 730 from the other views. Other types of effects are possible, for example, changing a color of result 730 (or other points), changing a size, a marker type (e.g., circles to triangles), among others.

Figure 8A:
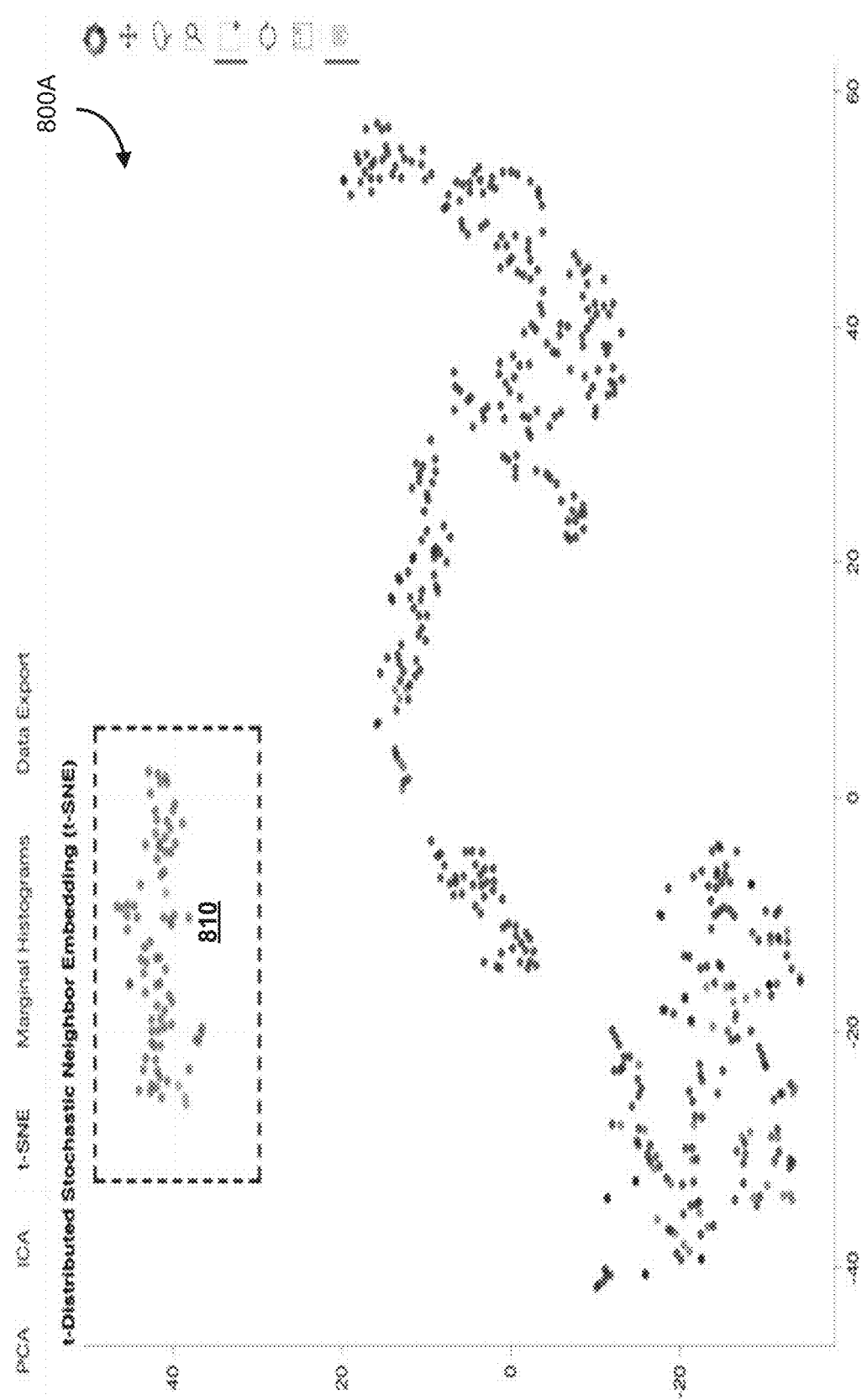
FIG. 8A is a diagram of a display at an interface of data querying system according to some embodiments.
Figure 8B:
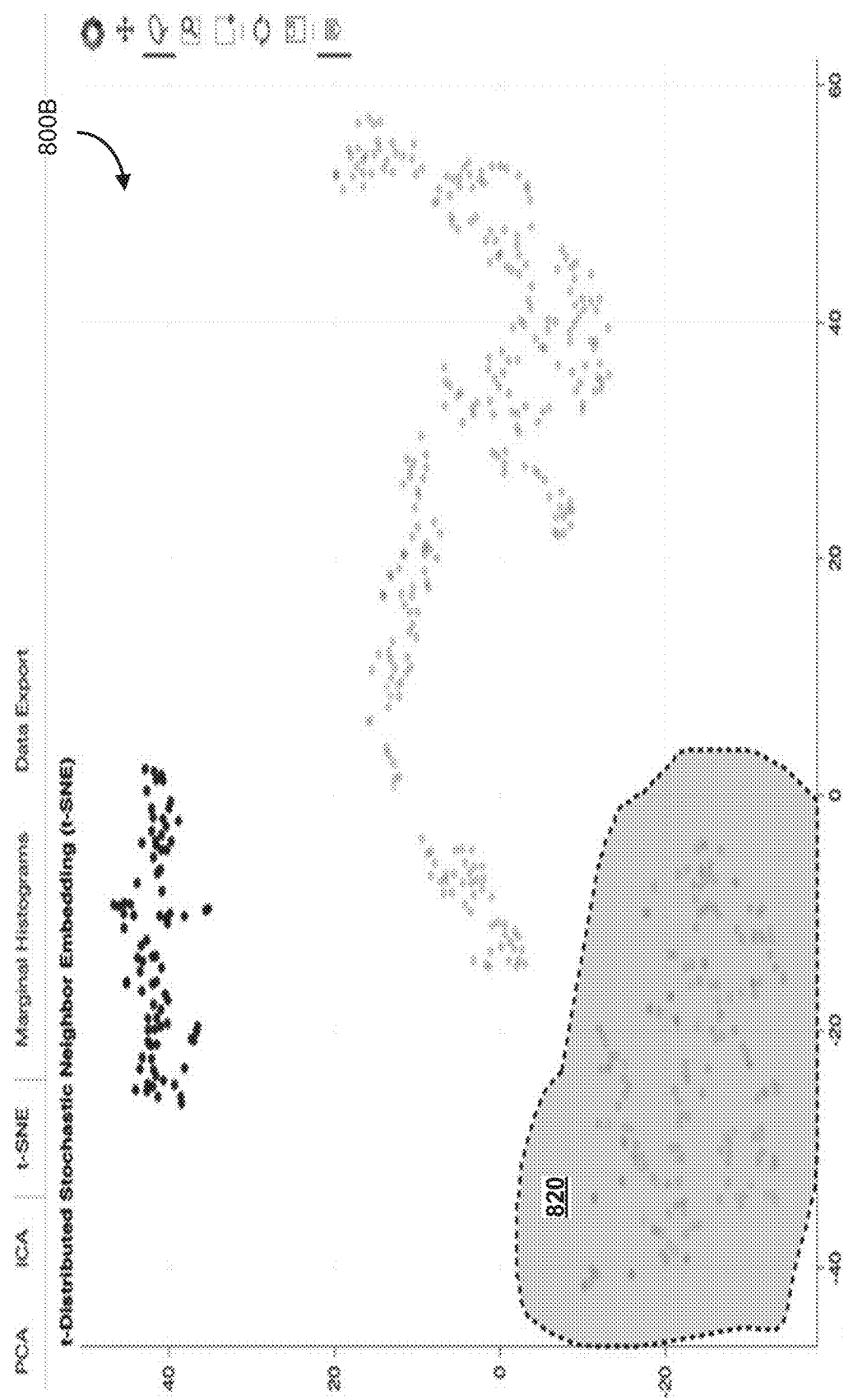
FIG. 8B is a diagram of a display at an interface of data querying system according to some embodiments.

Interface application 130 enables union of selections. For example, this functionality can behaves like the conjunctive clauses in SQL (e.g., where similarity is in the data retrieved). FIG. 8A and FIG. 8B are each plot diagrams 800A, 800B, respectively of an example selection 810 and 820, respectively, on the same plot or display with the union selection mode on. When the union selection mode is on, a user engaged at interface application 130 can select the union of multiple mouse drags. This operation is not only available on the same plot or display, it is possible to do it across different maps and histograms, supporting extremely complex queries not feasible using SQL.

Figure 8C:
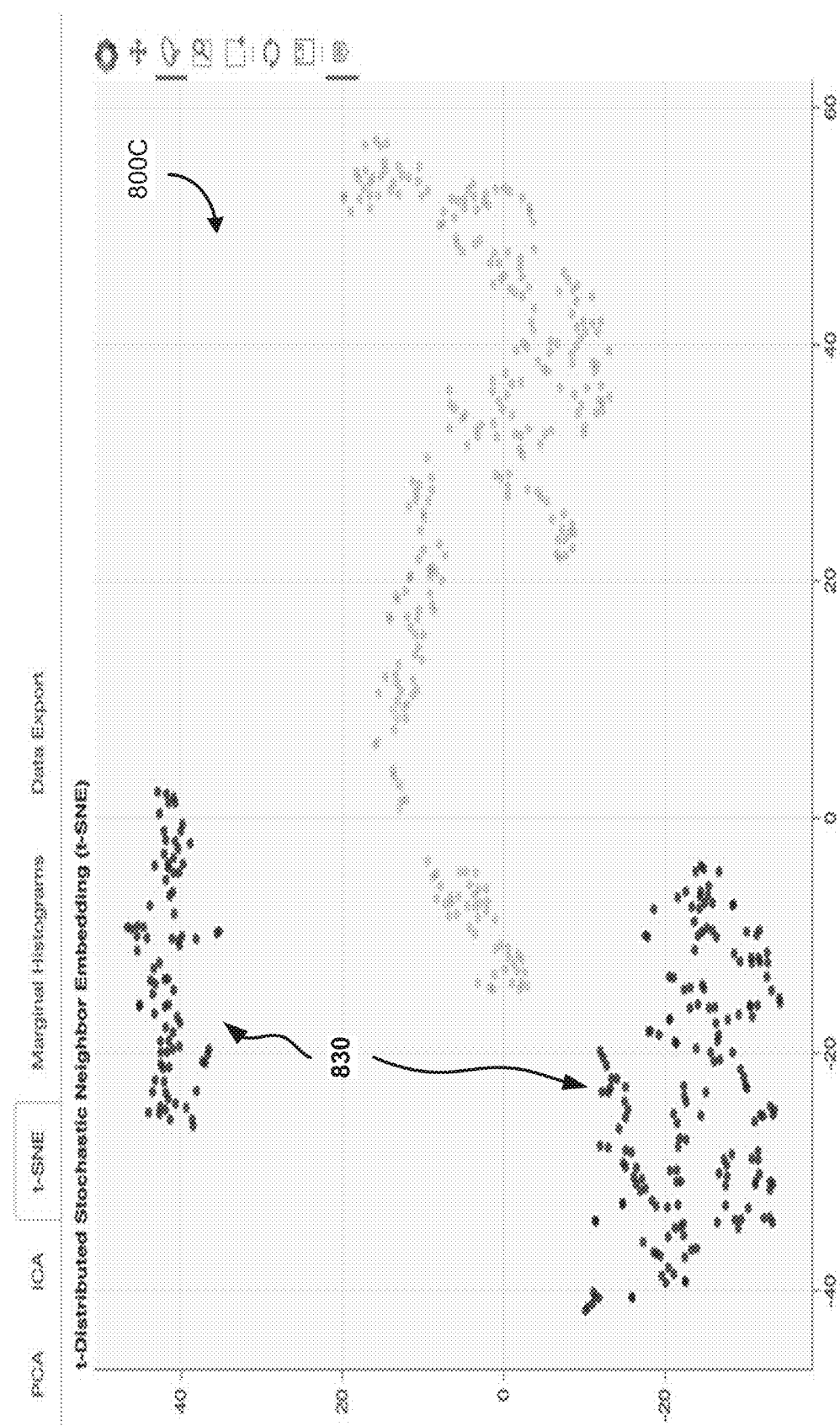
FIG. 8C is a diagram of a display at an interface of data querying system according to some embodiments.

FIG. 8C is an example plot diagram 800C of a result 830 of the selections 810 and 820 depicted in FIG. 8A and FIG. 8B. The data indicators corresponding to the intersection of the data that was selected is augmented in FIG. 8C. This provides the user with intuitive visualization of the union of the data underlying their selections of two sets of data indicators.

Interface application 130 enables nesting different selections. For example, the aforementioned operations can be used together across different maps to form a nested query. For example, one can select a cluster from one projected map, then union to the outliers from another map, and intersect with one column (e.g., histogram) that has values smaller than a threshold.

In some embodiments described herein, queries can be performed through a visual interface and embodiments support nested disjunctive and conjunctive operations and can be based on both the original data space as well as the projected space. Data querying system 100 can be easy to use (e.g., no coding expertise required) and can be powerful in the sense that the queries supported are not possible with SQL. Data querying system 100 leverages the power of data visualization.

Data querying system 100 can structure storage of an original data space in query device 120, at data sources 160, or at external systems 150. The data can be stored in logical table format, with rows representing data entries and columns being features of an entry. For example, the data can be stored using the "column data source" data structure from a library (e.g., Python Bokeh™ library). Projections of the original data space can be computed and stored to augment the data table (e.g., for the scatterplots).

Data querying system 100 can identify and group data (e.g., from a data structure standpoint) which has been selected on a scatterplot using indices for each data entry. For example, when a subset of the data space is selected from the frontend (e.g., on a projected data space viewed at interface application 130), data querying system 100 can record the indices of those selected entries (e.g., in "column data source"). For example, data querying system 100 can use the indices to map to corresponding data in the original data space.

Data querying system 100 can combine, perform operations, and/or determine correlations between data selected from different plots (e.g., plots showing different dimensions). In some embodiments, data is stored in a logical table format and plots showing different dimensions can be essentially the data distribution of a single column from the logical table. Scatterplots can be generated from projections, which can be computed using unsupervised machine learning algorithms, and they can be stored to augment the logical data table (e.g., correspond to two columns). All the plots can share the same "column data source" on the backend (e.g., at database 127 or database 170). This can enable data querying platform 110 to perform operations across different plots.

When data indicators are selected on one chart, they can be mapped (e.g., using a hash table or logical table) in data querying system 100 to provide highlighting of the corresponding data on another graph. This is supported by using the same "column data source" at the backend. For example, all plots or displays can share the same "column data source" from the backend, but just display different features (projections or dimensions). Therefore, when data is selected from one plot or display, data querying platform 110 can augment corresponding data on other plots or displays—other plots can "know" what is selected.

Data querying system 100 is configured to identify and store data selected on a plot or display at interface application 130. When some data indicators corresponding to data are selected from the plot or display, data querying platform 110 and/or interface application 130 records their row indices from the "column data source".

When multiple selections are made at interface application 130, data querying system 100 can receive and store the points selected in each shot, and then compute their union or intersect, as appropriate, for example. Data querying system 100 is configured to link data from one plot or display to another plot or display, such that data selected on a first plot or display is highlighted on a second plot or display. In some embodiments, all plots share one data structure on the backend.

An original data space can be stored as a data file representation (e.g., .csv file, or a preprocessed Pandas DataFrame (.pkl), for example). Data querying system 100 can manipulate and/or process an original data space for display at interface application 130. Data querying system 100 can load an original data space into a "column data source" data structure. Unsupervised machine learning algorithms can be performed to augment the data structure with more projection features.

All plots or displays can share this same data structure. For example, all plots or displays can depict data indicators that correspond to this same data structure. Scatterplots can be generated from two columns (projection features), and a marginal distribution can be generated from one of the original columns. Data querying platform 110 can transmit data enabling generation of scatterplots or other displays of a projected data space generated from the original data space.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

FIG. 9A is a table 900A showing an example set of higher-dimensionality points having augmented columns showing additional dimensions, according to some embodiments. The additional dimensions shown in table 900A correspond to views, which include additional data that is computed and appended to the dataframe, according to some embodiments.

Figure 9B:
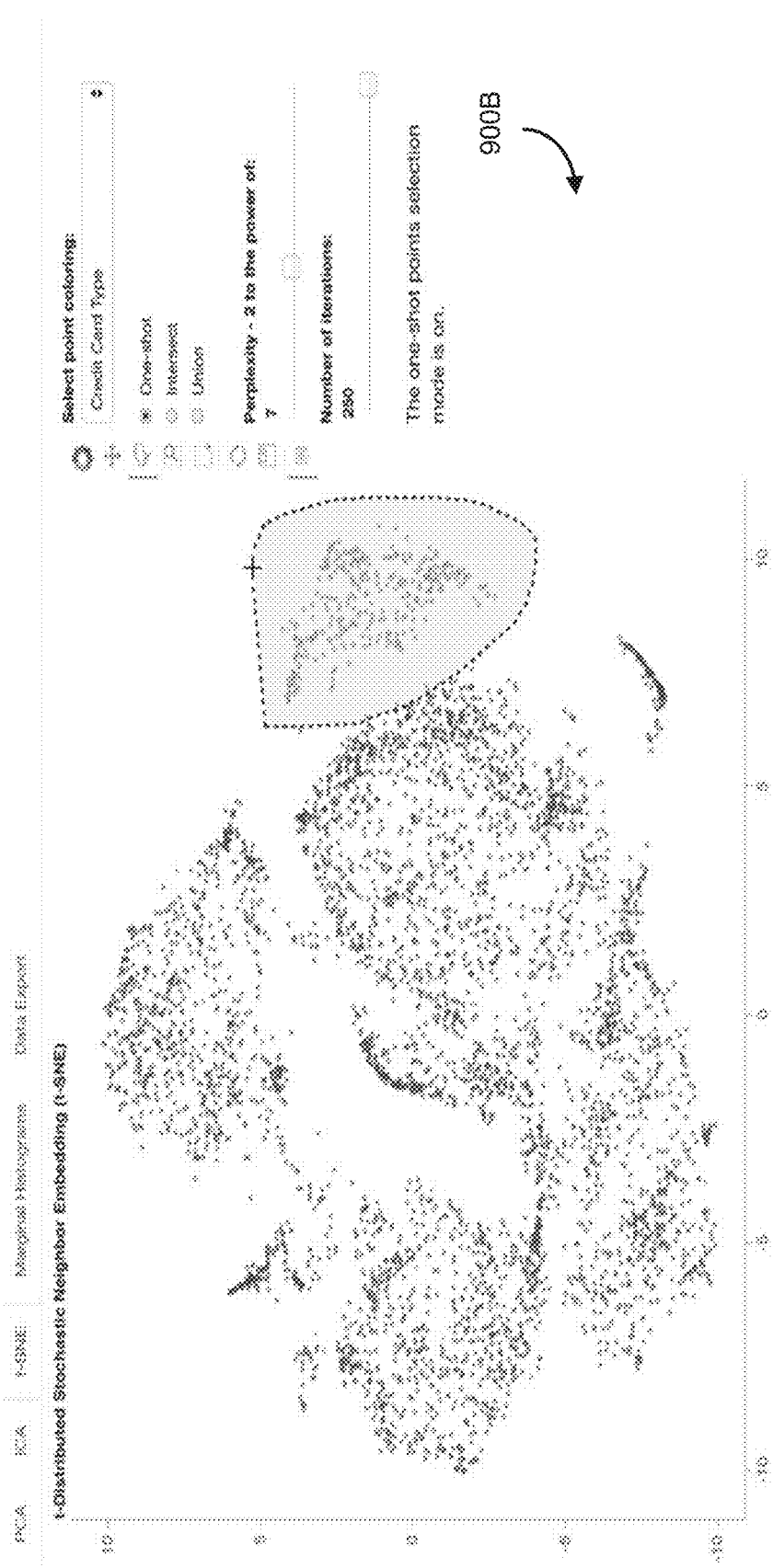
FIG. 9B is an example scatterplot graphical view generated by the system, according to some embodiments.

FIG. 9B is an example scatterplot graphical view 900B generated by the system, according to some embodiments. As shown in relation to table 900A, the selection is tracked in the additional dimensions represented in the additional columns.

Figure 9C:
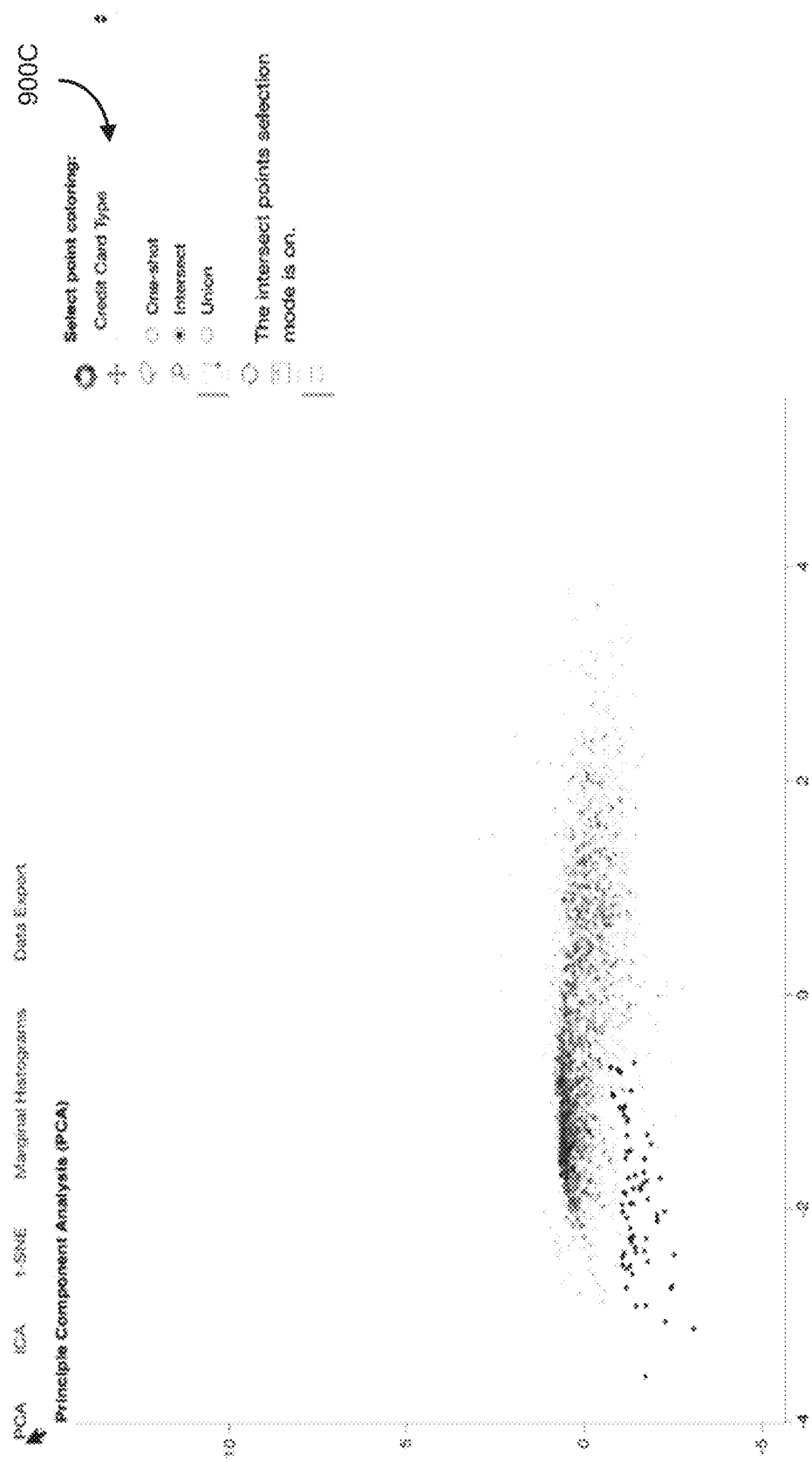
FIG. 9C is an example scatterplot graphical view generated by the system, where a masking effect is applied using the selection tracked in the additional dimensions represented in the additional columns.

FIG. 9C is an example scatterplot graphical view 900C generated by the system, where a masking effect is applied using the selection tracked in the additional dimensions represented in the additional columns. Accordingly, the information of table 900A is used to generate the intersect and points have different visual characteristics applied, as shown in visualization 900C.

Figure 9D:
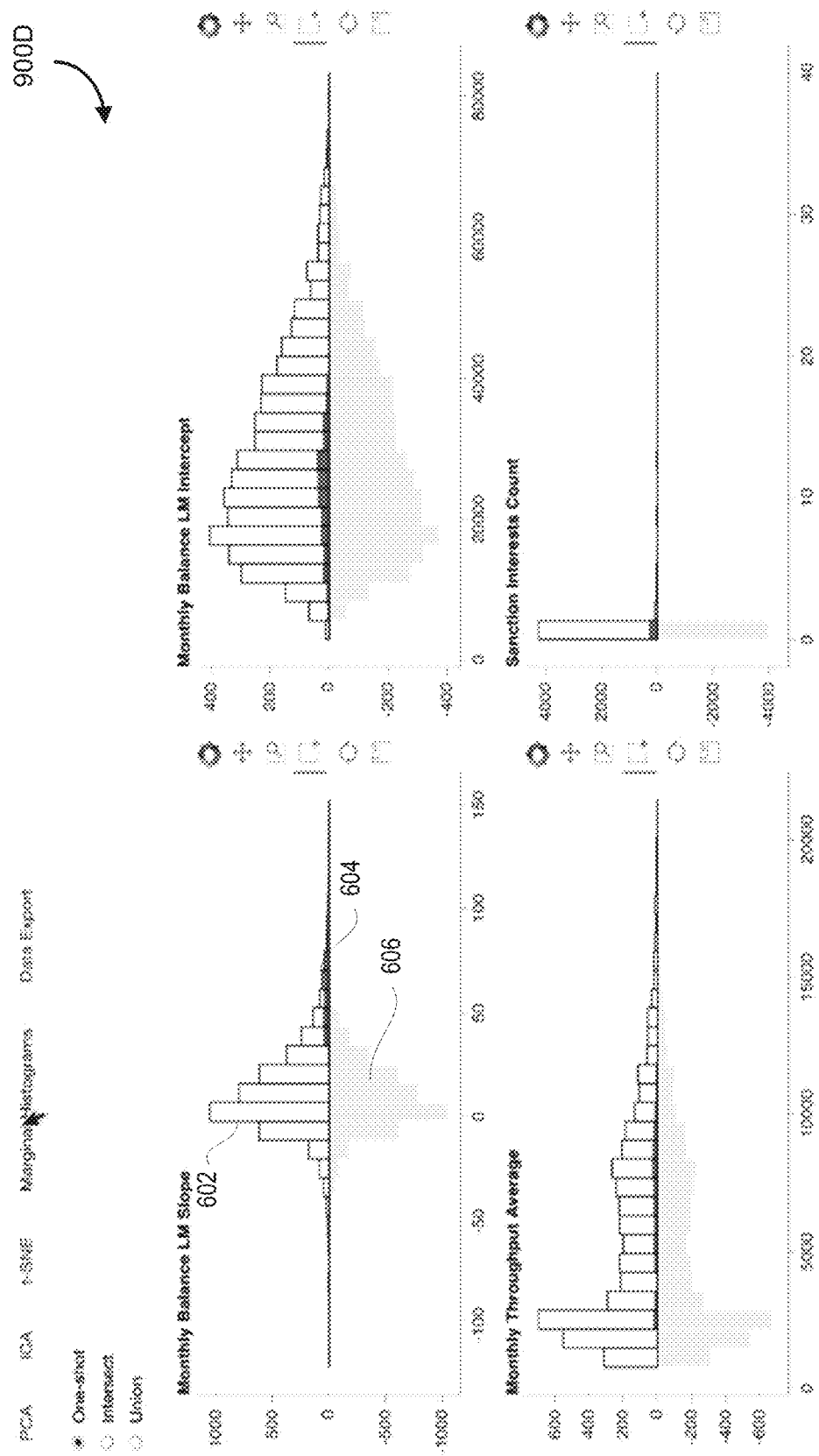
FIG. 9D is a set of histograms on a graphical view generated by the system which show elements modified based on the additional dimensions represented in the additional columns, according to some embodiments.

FIG. 9D is a set of histograms on a graphical view 900D generated by the system which show elements modified based on the additional dimensions represented in the additional columns, according to some embodiments. Similar to visualization 900C, the additional dimensions represented in the additional columns, according to some embodiments are used to establish the different points represented by the different visual effects, shown by 602 (all points), 604 (all selected points of other views), 606 (differences between all points and all selected points of other views). More complex examples are possible as can be derived from the additional dimensions represented in the additional columns.

The output may be a selected subset of table 900A, identifiers thereof, such as primary/foreign key values or pointers, and a data file encapsulating the same. The output, in some embodiments, includes the additional columns established responsive to the user's selections on each view, which can be used for regeneration of the interfaces and their selections, or in some embodiments, the output may not include the additional columns (e.g., to reduce storage costs).

The output may be consumed by downstream electronic devices, for example, used for investigating financial credit scoring/insight extraction, healthcare management, purchase tracking, among others. A visual tool is provided that allows for visual hypothesis validation/generation across different permutations and combinations of views, which is useful in the context of higher-dimensionality data that is otherwise difficult to interact with by humans. The visual tool can be incorporated into various types of display devices, including computer monitor displays, touchpads, tablets, virtual reality systems, and embodiments described herein are not meant to be limited to specific implementations used in the examples.

The improved interface interoperates with a backend to augment the data sets in some embodiments such that the underlying data points are extended to include selection data, and the extensions are used to derive the final output data set based on data operations on the extended data.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components.

Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For simplicity only one computing device data querying platform 110 is shown in FIG. 2, but the respective systems may include more computing devices operable by users to access remote network resources and exchange data. The computing devices may be the same or different types of devices. The computing device includes at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only.

What is claimed is:

1. A computer system for providing an interactive interface for visual construction of data querying operations in relation to a plurality of multi-dimensionality data points, the system comprising:
a processor configured to:
retrieve a plurality of multi-dimensionality data points from a data storage or computer memory;
transform, for each view of a plurality of distinct views, each point of the plurality of multi-dimensionality data points into a reduced-dimensionality data point in accordance with a transformation function associated with the view, the corresponding plurality of reduced-dimensionality data points defining a set of reduced-dimensionality data points associated with the view;
generate signals to render, on the interactive interface, a plurality of display layouts, each display layout corresponding to a view of the plurality of distinct views, and each display layout rendering the set of the reduced-dimensionality data points associated with the view to form a constellation of graphical user interface elements;
for at least one of a plurality of display layouts, receive an input selection from an input device coupled to the computer system indicative of a corresponding set of selected multi-dimensionality data points by a user; and
perform one or more data operations against the sets of selected multi-dimensionality data points corresponding to each of the distinct views to generate an output data structure storing a subset of the plurality of multi-dimensionality data points.

2. The system of claim 1, wherein the processor is configured to:
extend a data structure storing the plurality of multi-dimensionality data points with at least one additional dimension, the number of additional dimensions based at least on the number of the distinct views or based at least on a number of distinct views having received selections.

3. The system of claim 2, wherein the processor is configured to, responsive to the input selection, update data stored in fields associated with the plurality of additional dimensions to indicate whether each multi-dimensionality data point is selected in a particular view of the one or more distinct views.

4. The system of claim 3, wherein the generating of the signals to render the plurality of display layouts includes applying a display mask feature to modify visual characteristics of the rendering of the constellation of the reduced-dimensionality data points associated with the view, modifying rendering points of the constellation based on the at least one additional dimensions indicative of selections in views other than the view corresponding to the display layout being rendered.

5. The system of claim 3, wherein the plurality of distinct views include two-dimensional histograms where each dimension of the histograms are mapped to individual dimensions of the plurality of multi-dimensionality data points, the histograms displaying, in a first visual characteristic, the plurality of multi-dimensionality data points mapped to the dimension of the histograms, and in a second visual characteristic, the subset of the plurality of multi-dimensionality data points mapped to the dimension of the histograms.

6. The system of claim 1, wherein the one or more data operations includes a union operation whereby the subset of the plurality of multi-dimensionality data points includes all of the selected multi-dimensionality data points corresponding to each of the distinct views.

7. The system of claim 1, wherein the one or more data operations includes an intersect operation whereby the subset of the plurality of multi-dimensionality data points includes only the selected multi-dimensionality data points that were common across all of the distinct views.

8. The system of claim 1, wherein the input selection is at least one of a rectangular selection or a lasso selection on the display interface, the input selection being transformed into a selection of points.

9. The system of claim 1, wherein the reduced-dimensionality data points are two-dimensional data points for display on the display interface having a X and a Y coordinate on a two-dimensional plane.

10. The system of claim 1, wherein the reduced-dimensionality data points are three-dimensional data points for display on the display interface, the three dimensional data points:
having a X coordinate on a three-dimensional space, a Y coordinate on the three-dimensional plane, and a Z coordinate on the three-dimensional space; or
having a X coordinate on a two-dimensional plane, a Y coordinate on the two-dimensional plane, and a opacity, radius or color value as a third dimension.

11. A computer implemented method for providing an interface for visual construction of data querying operations in relation to a plurality of multi-dimensionality data points, the method comprising:
generating a plurality of distinct views of the plurality of multi-dimensionality data points wherein, for each view, each point of the plurality of multi-dimensionality data points is transformed into a reduced-dimensionality data point in accordance with a transformation function associated with the view, the corresponding plurality of reduced-dimensionality data points defining a set of reduced-dimensionality data points associated with the view;
generating signals to render, on a display interface, a plurality of display layouts, each display layout corresponding to a view of the plurality of distinct views, and each display layout rendering the set of the reduced-dimensionality data points associated with the view to form a constellation of graphical user interface elements;
for at least for each of a plurality of the one or more display layouts, receiving an input selection indicative of a corresponding set of selected multi-dimensionality data points; and
performing one or more data operations against the sets of selected multi-dimensionality data points corresponding to each of the distinct views to generate an output data structure storing a subset of the plurality of multi-dimensionality data points.

12. The method of claim 11, comprising extending a data structure storing the plurality of multi-dimensionality data points with at least one of additional dimension, the number of additional dimensions based at least on the number of the plurality of distinct views or based at least on a number of distinct views having received selections.

13. The method of claim 12, wherein the plurality of additional dimensions are utilized to indicate whether each multi-dimensionality data point is selected in a particular view of the one or more distinct views.

14. The method of claim 13, wherein the generating of the signals to render the plurality of display layouts includes applying a display mask feature to modify visual characteristics of the rendering of the constellation of the reduced-dimensionality data points associated with the view, modifying rendering points of the constellation based on the at least one additional dimensions indicative of selections in views other than the view corresponding to the display layout being rendered.

15. The method of claim 13, wherein the plurality of distinct views include two-dimensional histograms where each dimension of the histograms are mapped to individual dimensions of the plurality of multi-dimensionality data points, the histograms displaying, in a first visual characteristic, the plurality of multi-dimensionality data points mapped to the dimension of the histograms, and in a second visual characteristic, the subset of the plurality of multi-dimensionality data points mapped to the dimension of the histograms.

16. The method of claim 11, wherein the one or more data operations includes a union operation whereby the subset of the plurality of multi-dimensionality data points includes all of the selected multi-dimensionality data points corresponding to each of the distinct views.

17. The method of claim 11, wherein the one or more data operations includes an intersect operation whereby the subset of the plurality of multi-dimensionality data points includes only the selected multi-dimensionality data points that were selected across all of the distinct views.

18. The method of claim 11, wherein the input selection is at least one of a rectangular selection or a lasso selection on the display interface, the input selection being transformed into a selection of points.

19. The method of claim 11, wherein the reduced-dimensionality data points are two-dimensional data points for display on the display interface having a X and a Y coordinate on a two-dimensional plane.

20. A non-transitory computer readable medium storing machine interpretable instructions, which when executed, cause a processor to perform a computer implemented method for providing an interface for visual construction of data querying operations in relation to a plurality of multi-dimensionality data points, the method comprising:

generating a plurality of distinct views of the plurality of multi-dimensionality data points wherein, for each view, each point of the plurality of multi-dimensionality data points is transformed into a reduced-dimensionality data point in accordance with a transformation function associated with the view, the corresponding plurality of reduced-dimensionality data points defining a set of reduced-dimensionality data points associated with the view;

generating signals to render, on a display interface, a plurality of display layouts, each display layout corresponding to a view of the plurality of distinct views, and each display layout rendering the set of the reduced-dimensionality data points associated with the view to form a constellation of graphical user interface elements;

for at least for each of a plurality of the one or more display layouts, receiving an input selection indicative of a corresponding set of selected multi-dimensionality data points; and performing one or more data operations against the sets of selected multi-dimensionality data points corresponding to each of the distinct views to generate an output data structure storing a subset of the plurality of multi-dimensionality data points.

* * * * *